US008566447B2

(12) United States Patent
Cohen et al.

(10) Patent No.: US 8,566,447 B2
(45) Date of Patent: Oct. 22, 2013

(54) VIRTUAL SERVICE SWITCH

(75) Inventors: David Cohen, Ridgewood, NJ (US);
James Younan, Warwick, NY (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 11/784,832

(22) Filed: Apr. 9, 2007

(65) Prior Publication Data
US 2007/0260723 A1 Nov. 8, 2007

Related U.S. Application Data

(60) Provisional application No. 60/791,043, filed on Apr. 10, 2006.

(51) Int. Cl.
*G06F 15/173* (2006.01)
(52) U.S. Cl.
USPC .......................... 709/226; 709/224; 709/227
(58) Field of Classification Search
USPC .............................. 709/226, 224, 227; 705/37
See application file for complete search history.

(56) References Cited

U.S. PATENT DOCUMENTS

| 7,110,977 | B2 | 9/2006 | Semret et al. ................... 705/37 |
| 7,421,402 | B2 * | 9/2008 | Chang et al. .................. 705/26.3 |
| 7,813,993 | B1 * | 10/2010 | Barto et al. ...................... 705/37 |
| 2002/0091612 | A1 * | 7/2002 | Greene et al. ................... 705/37 |
| 2005/0283788 | A1 * | 12/2005 | Bigagli et al. ................. 719/318 |
| 2006/0059492 | A1 * | 3/2006 | Fellenstein et al. ........... 718/104 |
| 2006/0149652 | A1 * | 7/2006 | Fellenstein et al. ............ 705/35 |
| 2006/0168584 | A1 * | 7/2006 | Dawson et al. ................ 718/104 |
| 2007/0011281 | A1 * | 1/2007 | Jhoney et al. ................. 709/220 |
| 2007/0127527 | A1 * | 6/2007 | Dan et al. ...................... 370/477 |
| 2007/0162914 | A1 * | 7/2007 | Deen et al. .................... 719/330 |

OTHER PUBLICATIONS

Awadallah, Amr, "The vMatrix: Server Switching," White paper, Computer Systems Lab, Stanford University, http://vmatrix.awadallah.com/vmatrix-ieee-ftdcs2004.pdf, 2004, 9 pages.
Baker, Mark, "Cluster Computing White Paper," http://arxiv.org/pdf/cs.DC/0004014, Version 2.0, Dec. 28, 2000, 119 pages.
Bellman, Richard, "On an Application of Dynamic Programming to the Synthesis of Logical Systems," Feb. 1959, pp. 486-493.
Brandt, J.M., "Monitoring Computational Clusters with OVIS," https://ovis.ca.sandia.gov/mediawiki/images/9/9c/SAND2006-7939.pdf, 2006, 57 pages.
Cameron, Kirk W., "Improvement of Power-Performance Efficiency for High-End Computing," http://scape.Cs.vt.edu/paper/FGCO5HPPAC.pdf, IEEE, 2005, pp. 1-8.

(Continued)

*Primary Examiner* — Nicholas Taylor
(74) *Attorney, Agent, or Firm* — Michael A. Springs

(57) ABSTRACT

Virtual service switching includes contracting to provide a requestor with a unit of computing capacity to a service within a specific time period, creating one or more plans based at least in part on the contracting, scheduling execution of the one or more plans using the computing capacity, and if a bid for at least part of the unit of computing capacity is received prior to the end of the specific time period, allocating at least part of the computing capacity based at least in part on the bid. Each of the one or more plans comprises software code and associated data.

89 Claims, 15 Drawing Sheets

(56) References Cited

OTHER PUBLICATIONS

Cao, Jin, "Internet Traffic Tends *Toward* Poisson and Independent as the Load Increases," http://cm.Bell-labs.com/cm/ms/departments/sia/doc/lrd2poisson.pdf, 2002, pp. 1-18.

Cheshire, Stuart, "It's the Latency, Stupid," http://www.stuartcheshire.org/rants/latency.html, 1996, 13 pages.

Cohen, Dave et al., "Application of Supply Chain Mechanisms to an On Demand Operating Environment," White paper, Merrill Lynch and IBM, 2006, pp. 143-154.

Der Hovanesian, Mara, "Cracking the Street's New Math," BusinessWeek Online, NY, Apr. 18, 2005, 2 pages.

Dongarra et al., "Overview of Recent Supercomputers," http://top500.org/orsc/2006/, May 2006, 57 pages.

Engelbart, D.C., "Augmenting Human Intellect: A Conceptual Framework," http://www.invisible revolution.net/engelbart/full_62_paper_augm_hum_int.html, 1962, 90 pages.

Feng, Wu-Chang et al., "Measurement-Based Characterization of a Collection of On-Line Games," USENIX Association, Internet Measurement Conference, 1995, pp. 1-14.

Feng, Wu-Chun et al., "Green Destiny: A 240-Node Compute Cluster in One Cubic Meter," http://public.lanl.gov/feng/presentations/021003-UIUC.pdf, 2002, 48 pages.

Feng, Wu-Chun et al., "High-Density Computing: A 240-Processor Beowulf in One Cubic Meter," Los Alamos National Laboratory, IEEE, 2002, pp. 1-11.

Fore, L.S. et al., "BladeCenter Solutions," http://www.research.ibm.com/journal/rd/496/fore.pdf, 2005, pp. 861-871.

Foster, I. et al., "Network Policy and Services: A Report of a Workshop on Middleware," http://www.ietf.org/rfc/rfc2768.txt, 2000, pp. 1-29.

Frachtenberg, Eitan et al., "Designing Parallel Operating Systems Via Parallel Programming," Los Alamos National Laboratory, http://hpc.pnl.gov/people/fabrizio/papers/europar04.pdf, 2004, 8 pages.

Freedman, Michael J. et al., "OASIS: Anycast for Any Service," http://www.coralcdn.org/oasis/, 2006, 14 pages.

Grit, Laura et al., "Sharing Networked Resources with Brokered Leases," University of CA, San Diego, http://www.cs.duke.edu/~grit/papers/shirako06.pdf, 2006, 14 pages.

Hardin, Garrett, "The Tragedy of the Commons," http://www.garretthardinsociety.org/articles/art_tragedy_of the_commons.html, 1968, 13 pages.

Holland, John H., "A Derived Markov Process for Modeling Reaction Networks," Dept. of EECS and Dept. of Psychology, Internet: http://mitpress.mit.edu/journals/pdf/evco_11_4_339_0.pdf, 2003, pp. 339-362.

Karagiannis et al., A Nonstationary Poisson View of Internet Traffic, http://www.ieee-infocom.org/2004/Papers/33_3.pdf, 2004, pp. 1-12.

Kenyon, Chris et al., "Forward Price Dynamics and Option Designs for Network Commodities," IBM Zurich Research Laboratory, Dec. 19, 2001, Draft 1.02, http://www.zurich.ibm.com/pdf/bandwidth/BFS02_Network_Derivatives.pdf, pp. 1-13.

Keppo, Jussi, "Pricing of Bandwidth Derivatives Under Network Arbitrage Condition," http://www-personal.Engin.umich.edu/~keppo/BandNetwork.pdf, 2001, pp. 1-39.

Kimbrough, Steven O. et al., "Message Management Systems: Concepts, Motivations, and Strategic Effects," http://www.personal.umich.edu/~samoore/papers/JMIS.pdf, May 26, 1992, pp. 1-31.

Koomey, Jonathan G. Ph.D., "Estimating Total Power Consumption by Servers in The U.S. and the World," Final report, http://enterprise.amd.com/downloads/svrpwruseecompletefinal.pdf, 2007, 30 pages.

Lam, Monica S. et al., "The Collective: A Cache-Based System Management Architecture," Stanford University, http://suif.stanford.edu/papers/nsdi05.pdf, 2005, 14 pages.

Lassetre, E. et al., "Dynamic Surge Protection: An Approach to Handling Unexpected Workload Surges Wtih Resource Actions That Have Dead Times," http://www.research.ibm.com/PM/selfmanage.ps, 2003, 6 pages.

Lee, Edward A. et al., PTIDES: Programming Temporally Integrated Distributed Embedded Systems, 2006 Conference on IEEE-1588, www.eecs.berkeley.edu/Pubs/TechRpts/2006/EECS-2006-82.pdf, NIST, Gaithersburg, MD, Oct. 2-4, 2005, 30 pages.

Leff, Harvey S. and Andrew F. Rex, "Maxwell's Demon 2: Entropy, Classical and Quantum Information, Computing," (book), IOP Publishing Ltd., 2003.

Licldider, J.C.R., "Man-Computer Symbiosis," IRE Transactions on Human Factors in Electronics, vol. HFE-1, Mar. 1960, pp. 4-11, Internet: http://groups.csail.mit.edu/medg/people/psz/Licklider.html, downloaded Jan. 9, 2007, 12 pages.

Licklider, J.C.R. et al., "The Computer as a Communication Device," Science and Technology (reprint), Apr. 1968, pp. 21-41.

Lucchetti, Aaron, "Fast Lane—Firms Seek Edge Through Speed As Computer Trading Expands," The Wall Street Journal, Dec. 15, 2006, 5 pages.

Martin, Richard et al., "Effects of Communication Latency, Overhead, and Bandwidth in a Cluster Architecture," Proceedings of the $24^{th}$ Annual Intl. Symposium on Computer Architecture (ISCA), Jun. 1997, pp. 85-97.

Massie, Matthew L. et al., "The Ganglia Distributed Monitoring System: Design, Implementation, and Experience," http://ganglia.info/papers/science.pdf, Elsevier B.V., 2004, pp. 818-840.

Mehta, Nina, "FIXing the Market Data Mess," http://www.fenews.com/fen48/inside_black_box.html, 2006, pp. 1-5.

Minsky, Marvin, "Steps Toward Artificial Intelligence," http://web.media.mit.edu/~minsky/papers/steps. Html, 1965, 73 pages.

Moore, Gordon E., "Cramming More Components Onto Integrated Circuits," Electronics, http://download Intel.com/research/silicon/moorespaper.pdf, vol. 38, No. 8, Apr. 19, 1965, 4 pages.

Pallay, "Milliseconds Matter," http://wallstreetandtech.com/advancedtrading/showarticle.jhtml?articleID=169500452, Aug. 22, 2005, 3 pages.

Pavlosoglou et al., "Towards Bottom-Up Network Architectures," http://cms.livjm.ac.uk/pgnet2003/Submissions/paper-37.pdf, 2003, 4 pages.

Phaal, P. et al., "InMon Corporation's sFlow: A Method for Monitoring Traffic in Switched and Routed Networks," http://www.ietf.org/rfc/rfc3176.txt, 2001, pp. 1-31.

Powers, Rob et al., "Short Term Performance Forecasting in Enterprise Systems," http://www.hpl.p.com/Techreports/2005/HPL-2005-50.pdf, HP Laboratories Palo Alto, HP Company, L.P., 2005, pp. 11 pages.

Sahai, Akhil, "Quartermaster—A Resource Utility System," http://www.hpl.hp.com/techreports/2004/HPL-2004-152.pdf, HP Laboratories, Palo Alto, Sep. 9, 2004, pp. 1-12.

Sarukkai, Sekhar et al, "Web Services and the Forgotten OSI Layer Six," http://www.looselycoupled.com/Opinion/2003/saruk-osi-infr0905.html, Sep. 5, 2003, pp. 1-4.

Satyanarayanan et al., Dimorphic Computing: Sustainable Performance Through Thick and Thin, http://www.sigmobile.org/mobisys/2006/posters/Lagar-Cavilla.pdf, 2006, pp. 1-2.

Schaefer, Stuart et al., "Modeling Data Centers as Economic Markets for Dynamic Service Provisioning and Resource Management," In the First Intl. Workshop on Virtualization Technology in Distributed Computing (VTDC), Tampa, FL, Nov. 2006, 8 pages.

Schmerken, "Tapping the Pipeline," Wall Street Technology, http://www.wallstreetandtech.com/showArticle.jhtml?articleID=47900733, Sep. 21, 2004, 5 pages.

Schmerken, "Data Volume Skyrockets," http://www.wstonline.com/resourcecenters/datamanagement/Showarticle.jhtml?articleID=164903661, Jun. 29, 2005, 4 pages.

Schreiber, Thomas, "Measuring Information Transfer," http://www.macalester.edu/~kaplan/knoxville/PRL00461.pdf, Jan. 19, 2000, pp. 461-464.

Selfridge, Dr. O.G., "Pandemonium: A Paradigm for Learning," Session 3, Paper 6, 1959, pp. 511-527.

Shannon, C.E., "A Mathematical Theory of Communication," The Bell System Technical Journal, vol. 27, pp. 379-423, 623-656, Jul., Oct. 1948 (reprint) http://cm.bell-labs.com/cm/ms/what/shannonday/shannon1948.pdf, 1948, pp. 1-55.

(56) References Cited

OTHER PUBLICATIONS

Shasha, Dennis et al., "The Virtues and Challenges of Ad Hoc + Streams Querying in Finance," http://sites.Computer.org/debull/A03mar/lerner.ps, IEEE, 2003, pp. 1-8.

Shaw, Mary, "Prospects for an Engineering Discipline of Software," IEEE, 1990, pp. 15-24.

Siegele, Ludwig, "The Beast of Complexity: The Future of Software May Be a Huge Internet-Borne Cloud of Electronic Offerings From Which Users Can Choose Exactly What They Want," The Economist Newspaper, Apr. 12, 2001, pp. 1-3.

Sirer, Emin Gun et al., "ClosestNode.com: An Open-Access, Scalable, Shared Geocast Service for Distributed Systems", Dept. of Computer Science, Cornell Univ. http://www.cs.cornell.edu/people/egs/Papers/closestnode.pdf, 2006, 3 pages.

Steele, Robert et al., "Evaluating SOAP for High Performance Business Applications: Real-Time Trading Systems," http://www.staff.it.uts.edu.au/~rsteele/evaluatingSOAP.pdf, 2002, 9 pages.

Sun Microsystems, "U.S. Daylight Savings Time Changes in 2007," http://java.sun.com/developer/technicalArticles/Intl/UDSST/, 2007, 2 pages.

Tassey, Gregory, Ph.D., "The Economic Impacts of Inadequate Infrastructure for Software Testing," http://www.nist.gov/director/prog-ofc/report02-3.pdf, U.S. Dept. of Commerce, May 2002, 300 pages.

Tsallis, Constantino, "Entropic Nonextensivity: A Possible Measure of Complexity," http://arxiv.org/abs/Cond-mat/0010150, 2001, pp. 1-19.

Upton, Darren S., "Modelling the Prices of Networked Resources," http://faculty-gsb.stanford.edu/Wilson/E608_06/pdf/Applied%20Models/Upton,Ne, 2006, pp. 1-9.

Vaidyanathan, K. et al., "Exploiting RDMA Operations for Providing Efficient Fine-Grained Resource Monitoring in Cluster-Based Servers," http://nowlab.cse.ohio-state.edu/publications/conf-papers/2006/Vaidyaarait06.pdf, 2006, pp. 1-10.

Willinger, Walter et al., "Scaling Phenomena in the Internet: Critically Examining Criticality," http://www.pnas.org/cgi/reprint/99/suppl_1/2573.pdf, 2002, pp. 2573-2580.

Woolf, Bobby, "Daylight Savings Time and Java," http://www.3.ibm.com/developerworks/blogs/trackback/woolf/weblog/daylight_savings_time_and_java, 2006, 3 pages.

Zurich Research Lab, IBM's Grid Economics Site, http://www.zurich.ibm.com/grideconomics, 2007, 1 page.

\* cited by examiner

VIRTUAL SERVICE SWITCH

CROSS REFERENCE TO RELATED APPLICATIONS

This application claims the benefit of provisional patent application No. 60/791,043 filed Apr. 10, 2006, entitled "Virtual Service Switch."

FIELD OF THE INVENTION

The present invention relates to the field of computer science. More particularly, the present invention relates to a system and method for a virtual service switch.

BACKGROUND OF THE INVENTION

Enterprises are typically completely dependent on technology. Therefore, any uncertainty related to this technology is potentially disastrous to the company's business. This uncertainty comes in many forms and is based on the idea of the control and delivery of regular and dependable connectivity, i.e., no disruption to service. This uncertainty includes information technology (IT) elements such as networking outages or any service disruption, data unavailability, and security breaches brought about by viruses and other attacks.

The number one issue facing IT Managers today is deciding on when to build the next data center. Expansion is typically straightforward but expensive. Thus, expansion is to be avoided if possible.

In this marriage of the core enterprise business and the technology which runs it, uncertainty also includes overhead and costs. The more all of these elements are introduced into the ecosystem, the more uncertainty occurs, and the more IT is needed to maintain in the future (in terms of money, people, and vendors). This economic description is often misunderstood as simple "extra costs" to be managed by re-arranging older solutions, re-utilizing hardware, outsourcing, or downsizing, when it is actually serious overhead related to uncertainty and control that drains the business's bottom line. This cost as a function of IT is represented in FIG. 1.

Programming (i.e., Software), is a language used to convey ideas or concepts. This firmly establishes software as a form of communication, which adheres to Claude Shannon's "Mathematical Theory of Communications". Shannon, "A Mathematical Theory of Communication," 1948. This means that Software (and more broadly data), is a Message that is encoded and decoded through computers. Shannon stipulates that these machines must allow for the broadest set of messages; having no knowledge of the semantic details within. The direct relevance of the computer as a communications device (Licklider et al., "The Computer as a Communication Device," 1969), and that the computations it produces are simply messages, means that switching operations are employed to support the need to share the underlying device. Such an approach was outlined by Bellman et al. in 1959. Bellman et al., "On an Application of Dynamic Programming to the Synthesis of Logical Systems," 1959. This general model of computing is illustrated in FIG. 2. As shown in FIG. 2, input/output component 210 of computer 220 receives data such as software. Processor 205 of computer 220 decodes data 215 based on a programming language to produce computation 200.

Within an Organization's network of data centers there is frequently a need to share information. By sharing we mean the transfer of data from one application to another over the IP network. Today, information associated with this communication is limited to packet processing. Little to no information about the transfer of data from one application to another exists in any meaningful way.

The difference between information and data lies in the existence (or absence) of encoding. Historically, a data center was home to one (or possibly two) large data processing unit(s). There was relatively little information, primarily because the production of a computation was an expensive endeavor. As a result, there was relatively little sharing. If an application needed access to data it ran on the data center's host computer. Over the course of the last forty years, with each cycle of Moore's Law, there has been a relative reduction in this unit cost. And with this reduction has come a corresponding increase in information. This increase has resulted in a corresponding increase in sharing.

Accordingly, a need exists for a solution that provides a company with relatively less uncertainty with respect to information technology. A further need exists for such a solution that provides a company with relatively less control overhead. A further need exists for such a solution that provides improved information sharing between applications over an IP network. A further need exists for such a solution that provides improved efficiency of a data center's scale-out capacity.

SUMMARY OF THE INVENTION

Virtual service switching includes contracting to provide a requestor with a unit of computing capacity to a service within a specific time period creating one or more plans based at least in part on the contracting, scheduling execution of the one or more plans using the computing capacity, and if a bid for at least part of the unit of computing capacity is received prior to the end of the specific time period, allocating at least part of the computing capacity based at least in part on the bid. Each of the one or more plans comprises software code and associated data.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
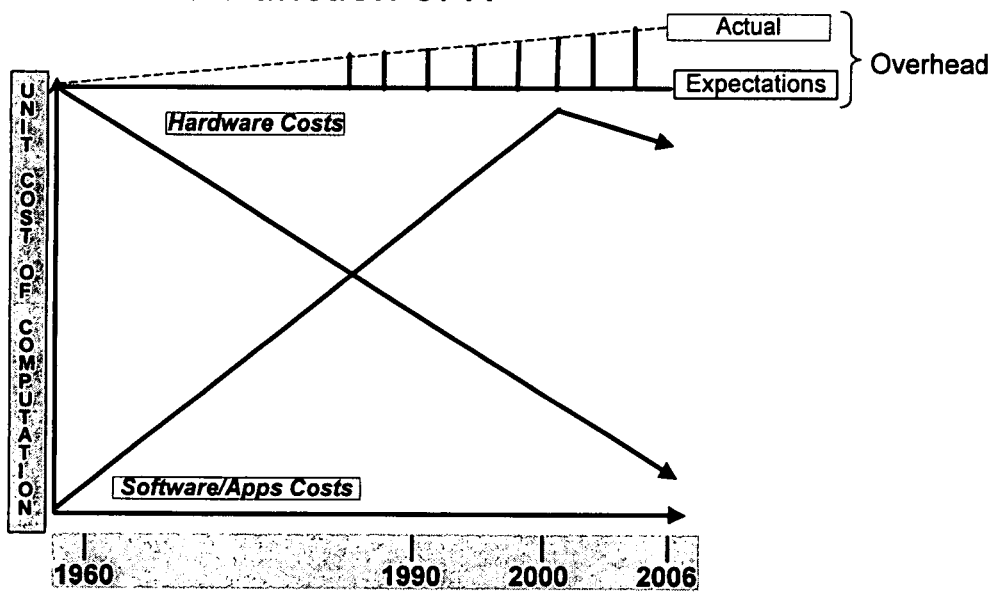
FIG. 1 is a graph that illustrates computation cost as a function of information technology (IT).
Figure 2:
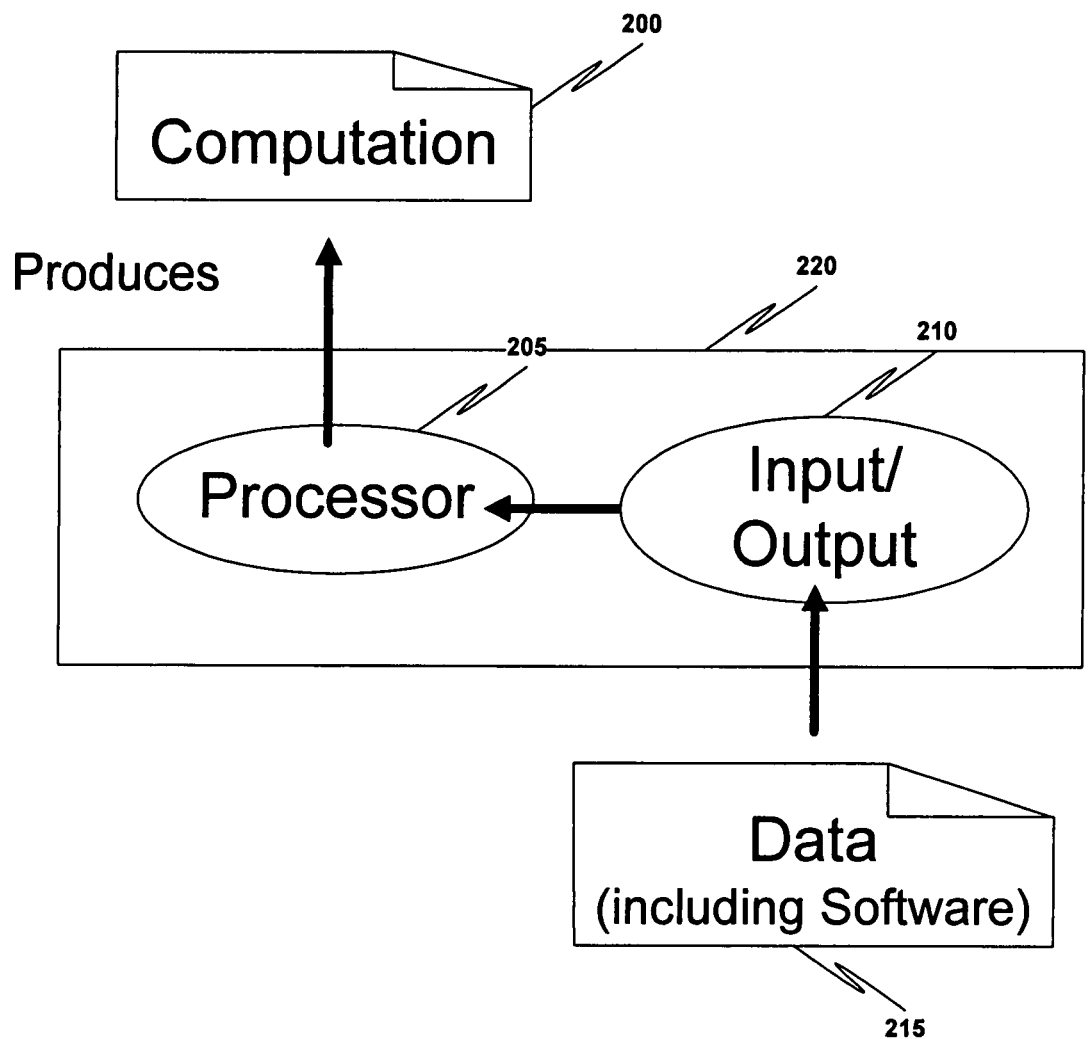
FIG. 2 is a flow diagram that illustrates a general model for computing.

Embodiments of the present invention are described herein in the context of a system and method for a virtual service switch. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, or a stand-alone device. The process can be implemented as instructions executed by such hardware, hardware alone, or any combination thereof. The software may be stored on a program storage device readable by a machine.

In addition, those of ordinary skill in the art will recognize that devices of a less general purpose nature, such as hardwired devices, field programmable logic devices (FPLDs), comprising field programmable gate arrays (FPGAs) and complex programmable logic devices (CPLDs), application specific integrated circuits (ASICs), or the like, may also be used without departing from the scope and spirit of the inventive concepts disclosed herein.

According to one embodiment of the present invention, the components, processes and/or data structures may be implemented using machine language, assembler, C or C++, JAVA® and/or other high level language programs running on a data processing computer such as a personal computer, workstation computer, mainframe computer, or high performance server running an OS such as Solaris® available from Sun Microsystems, Inc. of Santa Clara, Calif., Windows Vista™, Windows NT®, Windows XP, Windows XP PRO®, and Windows® 2000, available from Microsoft Corporation of Redmond, Wash., Apple OS X™-based systems, available from Apple Inc. of Cupertino, Calif., or various versions of the Unix operating system such as Linux available from a number of vendors. The method may also be implemented on a mobile device running an OS such as Windows CE®, available from Microsoft Corporation of Redmond, Wash., Symbian OS™, available from Symbian Ltd of London, UK, Palm OS®, available from PalmSource, Inc. of Sunnyvale, Calif., and various embedded Linux operating systems. Embedded Linux operating systems are available from vendors including MontaVista Software, Inc. of Sunnyvale, Calif., and FSMLabs, Inc. of Socorro, N. Mex. The method may also be implemented on a multiple-processor system, or in a computing environment comprising various peripherals such as input devices, output devices, displays, pointing devices, memories, storage devices, media interfaces for transferring data to and from the processor(s), and the like. In addition, such a computer system or computing environment may be networked locally, or over the Internet.

In the context of the present invention, the term "network" comprises local area networks, wide area networks, the Internet, cable television systems, telephone systems, wireless telecommunications systems, fiber optic networks, ATM networks, frame relay networks, satellite communications systems, and the like. Such networks are well known in the art and consequently are not further described here.

In the context of the present invention, the term "identifier" describes one or more numbers, characters, symbols, or the like. More generally, an "identifier" describes any entity that can be represented by one or more bits.

In the context of the present invention, a financial instrument is an instrument that represents equity, debt, currency/foreign exchange, and commodities as well as their derivatives. An instrument is traded in the Markets.

In the context of the present invention, the term "constraint based scheduling" refers to providing a specific unit of capacity to a service within a specific time period, according to and within the policies established in the system. Constraint based scheduling requires the functions of planning, scheduling, pre-staging, data management, monitoring, and post-job tear down of a specific service.

In the context of the present invention, the term "capacity request" describes the parameters of a request for resources to meet projected demand for a service. The description comprises one or more of the following:

The Service (e.g. virtual desktop)
The service class (e.g. trader, office worker)
The quantity of the resource requested (e.g. 1,000)
The time at which demand for the resources is expected to materialize The duration of expected use of the resource (may also be specified as an end time)

Geographic constraints (to address proximity and HA requirements)

In the context of the present invention, the term "Distributed Hash Table" (DHT) describes a type of distributed system that allocates a key space among a series of nodes for the purpose of coordinating searches across peers. It is a common piece of infrastructure in peer-to-peer networks. A DHT may be used by a Service Management Framework to distribute service demand across available capacity on peered virtual service switches (VSSes).

In the context of the present invention, the term "GridFTP" describes an enhanced version of the standard FTP protocol. This service is configured to provide for secure, managed, high-performance transfer for file-oriented data between storage systems. GridFTP is used for data staging between a global catalog's persistent data repository and VSS local storage.

In the context of the present invention, the term "Reliable File Transfer" (RFT) describes a service layered on top of GridFTP, to provide for reliable management of many transfers.

In the context of the present invention, the term "Service" describes a component that is configured to provide functionality, such as Virtual Desktops to users (consumers) via a port in a VSS/Network (VSS/N). This may be represented as, for example, "rdp://vds.ml.com."

In the context of the present invention, the term "Service Class" describes a grade of service defined by a set of Quality of Service (QoS) parameters (e.g. amount of CPU and memory). A virtual desktop service may have different service classes for a "trader" and an "office worker" which may be specified in the global catalog as, for example, "rdp://vds.ml.com/trader" and "rdp://vds.ml.com/officeworker".

In the context of the present invention, the term "Service Agent" describes a component that implements control mechanisms for a specific service and service class.

In the context of the present invention, the term "Service Management Framework" describes a set of interfaces that defines the protocol by which service agents drive actions on other services in a VSS/N (e.g. schedulers, other service agents).

In the context of the present invention, the term "Service Manager" describes an entity that manages demand on behalf of a set of end users, through creation of capacity requests to meet that demand, and handling of exceptions that may be raised, for example due to loss of capacity from failures.

Figure 3:
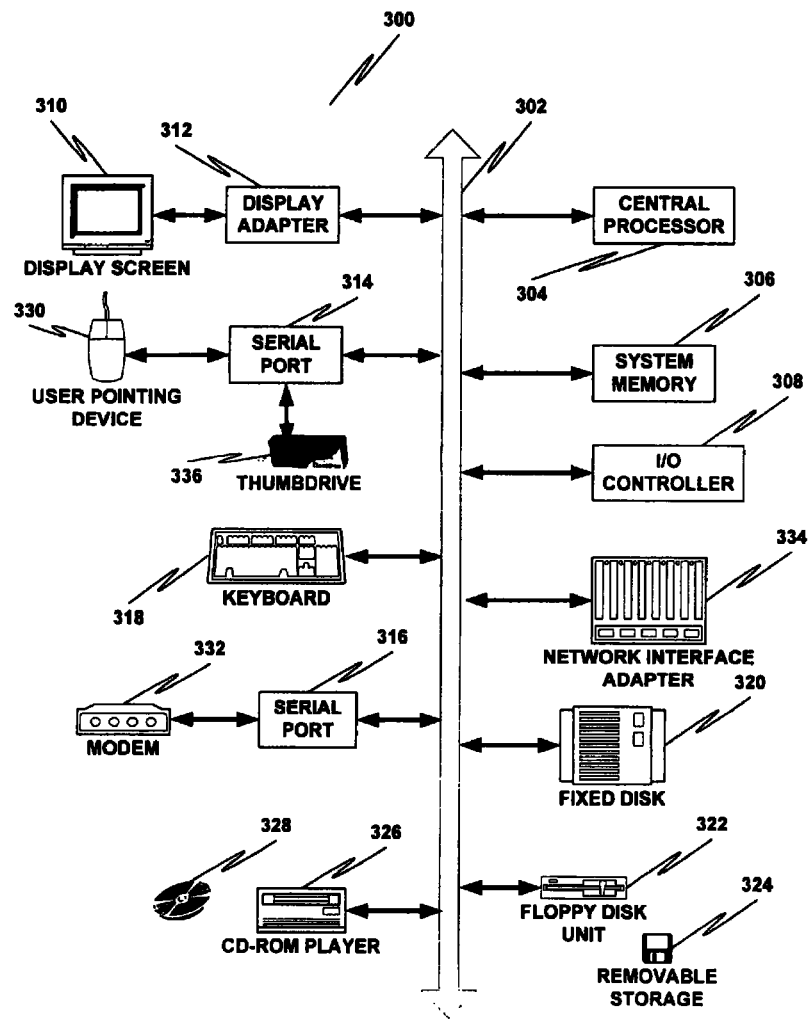
FIG. 3 is a block diagram of a computer system suitable for implementing aspects of the present invention.

FIG. 3 depicts a block diagram of a computer system 300 suitable for implementing aspects of the present invention. As shown in FIG. 3, computer system 300 comprises a bus 302 which interconnects major subsystems such as a central processor 304, a system memory 306 (typically RAM), an input/output (I/O) controller 308, an external device such as a display screen 310 via display adapter 312, serial ports 314 and 316, a keyboard 318, a fixed disk drive 320, a floppy disk drive 322 operative to receive a floppy disk 324, and a CD-ROM player 326 operative to receive a CD-ROM 328. Many other devices can be connected, such as a pointing device 330 (e.g., a mouse) connected via serial port 314 and a modem 332 connected via serial port 316. Modem 332 may provide a direct connection to a remote server via a telephone link or to the Internet via a POP (point of presence). Alternatively, a network interface adapter 334 may be used to interface to a local or wide area network using any wired or wireless network interface system known to those skilled in the art (e.g., Infiniband, Ethernet, xDSL, AppleTalk™, IEEE 802.11, and Bluetooth®).

Many other devices or subsystems (not shown) may be connected in a similar manner. Also, it is not necessary for all of the devices shown in FIG. 3 to be present to practice the present invention, as discussed below. Furthermore, the devices and subsystems may be interconnected in different ways from that shown in FIG. 3. The operation of a computer system such as that shown in FIG. 3 is readily known in the art and is not discussed in detail in this application, so as not to overcomplicate the present discussion. Code to implement the present invention may be operably disposed in system memory 306 or stored on storage media such as fixed disk 320, floppy disk 324, CD-ROM 328, or thumbdrive 336.

Embodiments of the present invention reduce uncertainty and control overhead through virtualization, via a Virtual Service Switch (VSS). A VSS is a physical machine that strictly separates computation from the underlying physical elements. The physical elements represent what is known as a von Neumann machine, i.e. one that loads software and data in advance of producing a specific computation. A VSS controls the uncertainty by delivering what is now the known commodity. Ownership is the initial contract. Execution is delivery of commodity. Planning is a critical determinant of the futures market, but ephemeral in nature because it is transient and has a logical end for each contract.

Embodiments of the present invention view the problem of increasing the capacity of existing data centers as a function of application-to-application connectivity over an IP network. Establishing a connection (i.e. a "Session") is considered to be a stochastic process. For a given application, there is uncertainty about the arrival rate of connection requests and the marginal capacity required to support the next request.

An application being hosted in a data center is not viewed in isolation. Instead, it is viewed as a constituent of a larger population all consuming the data center's fixed capacity (in terms of space, power, and performance). The data center is viewed as singular capital, or rather "Plant" asset. The owner responsible for an application is treated as analogous to a "Product Manager" in a modern manufacturing plant. They are granted the privilege of leasing a portion of the Plant's capacity. The sum of all leases to be enacted in a given time interval represents the "plan."

Embodiments of the present invention guarantee the fair and equitable distribution of resources through the scheduling mechanism of the commodities markets. Competing service providers may be allowed to exist within the enterprise, operating in this commodity market. This ability makes a VSS a Market Maker, because these allocations are governed by the same economic scheduling—market mechanics employed in the traditional commodities market.

For a commodity to be fungible it must have the characteristic of "interchangeability" or "transferability." This allows for a futures contract to specify the quality, quantity, delivery date and delivery location(s). Contracts for the same commodity and delivery date are therefore fungible due to their standardized specifications. This means that transfer of ownership of the commodity can be achieved through economic means via the market. There are, however, constraints on the marketability of a commodity.

Embodiments of the present invention deliver shared, computer infrastructure for use in a variety of services by making computing resources "fungible" or transferable. Mechanics of the commodity market are employed to exploit the leverage in control of uncertainty. Embodiments of the present invention do not move load. Rather, embodiments of the present invention focus on a physical facility's property as a fungible or transferable commodity. IT management is taken to a new level, by controlling aspects such as outsourcing, in-house development, equipment, hosting, etc., thereby elevating the concept of "transferability" in a novel way.

Embodiments of the present invention enable a "Futures Market" in which planning for resources occurs at the beginning of the compute process. Ownership is established from the service provider to the highest bidder, rebalancing the allocations based on priority, creating a "Spot Market". Using planned activities against available capacity, computing resources can be quickly and properly provisioned, can be moved from one requestor to another based on price, and as a result can be "traded" to the highest bidder. Hence, embodiments of the present invention create their own economic process, based on the fungibility of computing combined with virtualization, all within the realm of traditional market behaviors and rules.

It is important to note the distinction between a contract synthesized in the spot market (i.e. the reaction/transfer) and one synthesized in the futures market. Marketability is limited to participants in the local market (e.g. a data center (DC)). All participants are known and the encoding of their existence is a prerequisite to participating in the spot market. A transfer operation is then simply a "Switching Function" that relates an owner/source and the buyer/destination.

These "Marketability" constraints were noted by Menger's "Principles of Economics". Menger, Principles of Economics (Chapter VII—The Theory of Commodity), 1871. Menger notes that the seller will not give up ownership of their commodity for an arbitrary price but rather for an expectation on what [price] the market will bare. He defines a commodity to be an economic good of any kind that is intended for sale. Subsequently he notes the constraints/limits on the marketability of such a commodity:

a. Demand—There are a limited number of buyers to whom the commodity can be sold.
  b. Location—There are a limited number of location(s) where the commodity can be sold.
  c. Quantity—There is a [quantitative] limit on the demand for the commodity.
  d. Timeframe—There is a decreasing window of time, i.e. a timeframe, within which demand for the commodity exists.

The futures and spot market work in unison to facilitate the pricing of a fungible commodity so that it reflects the price the market will bare and the expectations of the supplier/producer. In the futures market, price is used to manage risk. For example, a manufacturing plant that relies on electricity might buy a futures contract to insure the delivery of electricity at a certain date in the future and at a price that is within their targets.

Conversely, the spot market is the market of immediate delivery of the product (and immediate payment). Differentiating between the future and spot market represents the narrowing of the marketability of a commodity.

Market fluctuations in price, as ownership of the commodity gets closer to the point of delivery (i.e. the governing contract is executed), accommodates and reflects the markets' "uncertainty." Policy governance and enforcement via use of economic and market mechanisms is specifically intended for this purpose (i.e., to accommodate uncertainty).

Embodiments of the present invention provide improved efficiency of a data center's scale-out capacity through the use of leasing. Such a contract expressly specifies the constraints imposed by both parties, i.e. the data center manager and the application owner. The lease further dictates the terms by which these parties are satisfied in the delivery of capacity from the data center manager to the application owner. A lease specifies, by way of example, the type of machine (e.g. OS/boot image, bandwidth, storage, memory/RAM, and processors), quantity, delivery date, duration, and unit cost ("rent") due once the terms have been satisfied. An application owner enters into one or more leases in order to calibrate their capacity to their needs. The scheduler/resource manager delivers all or a portion of this capacity to an application.

The benefit of this approach is that it develops a meta-model of how the data center's resources are allocated and used over time. The data center manager retains ownership of the assets while affecting transient transfer of control to the application owner. For example, the data center owner may choose to turn resources off when not in use.

This separation of ownership and control also means that applications can be migrated from one set of [hardware] resources to another as long as the constraints of the lease are satisfied. By separating the performance of the underlying capacity from that of the application the data center manager is provided with a new tool for optimization.

Finally, the data center manager is also free to provide incentive to an individual application. The use of leasing enables subleasing, meaning that capacity committed to one application can be transferred to a second application by arriving at mutually agreed upon terms.

Figure 4:
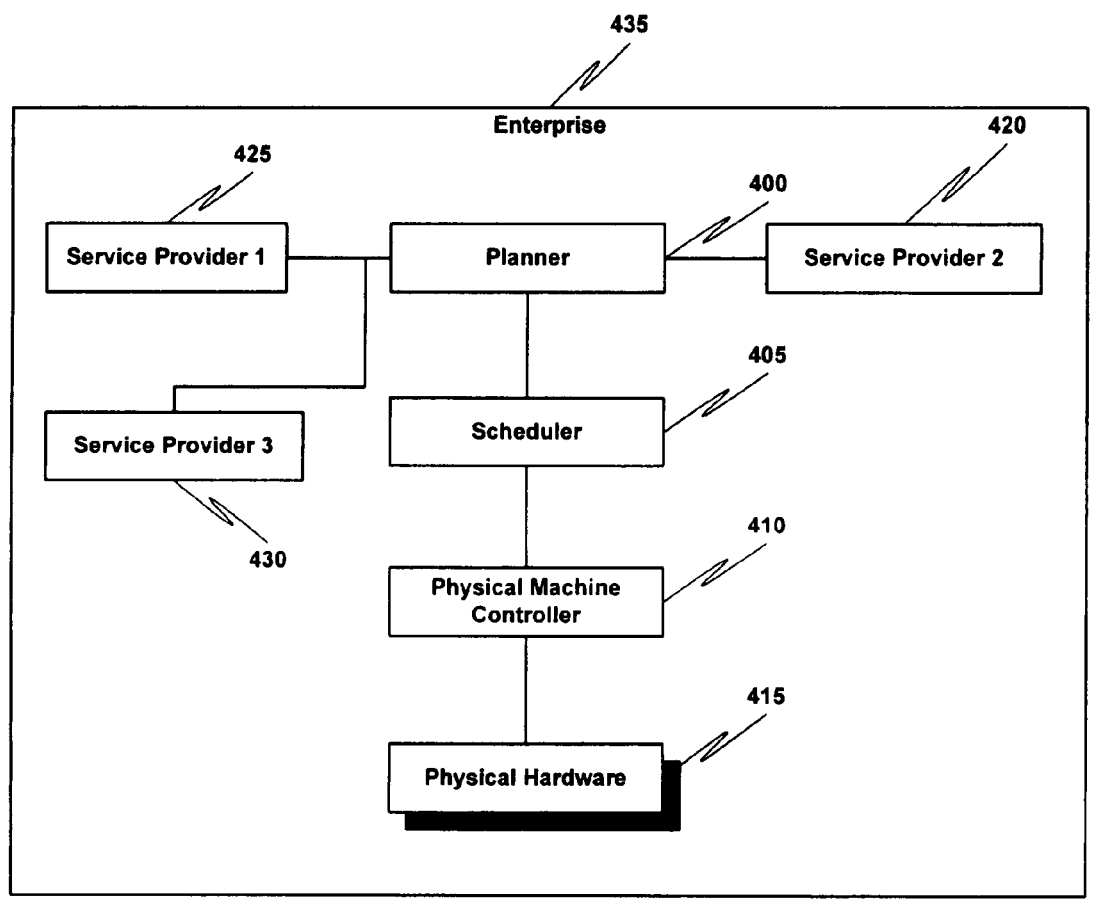
FIG. 4 is a block diagram that illustrates a virtual service switch, in accordance with one embodiment of the present invention.

FIG. 4 is a block diagram that illustrates a virtual service switch, in accordance with one embodiment of the present invention. As shown in FIG. 4, a VSS comprises physical hardware 415 or compute elements to load software and data in advance of producing a specific computation, a planner 400, a preemptive scheduler, and a physical machine controller (PMC) 410.

Service Providers

According to one embodiment of the present invention, a set of autonomous agents exists within an organization, each serving to deliver a computational service to their respective consumer(s). These autonomous agents are referred to as service providers (425, 420, 430).

According to one embodiment of the present invention, a VSS device is built to Claude Shannon's specification, i.e., in support of the broadest possible combination of inputs of software and data). The computation in question being one specialized for use by a particular service provider (425, 420, 430). A VSS device is used to produce many different types of computation, each type representing a specialization of software and data stipulated by a service provider (425, 420, 430).

Planner

To accommodate the scale-free property of an organization's data network, a VSS/N's service management framework is configured to provide a means of accounting for the transference of computation to the service provider's consumers. Scale-free networks are characterized by an uneven distribution of connectedness. Instead of the nodes of these networks having a random pattern of connections, some nodes act as "very connected" hubs, and this dramatically influences the way the network operates.

Embodiments of the present invention address this "connectedness" in the planning phase where a service provider expresses their expectation of load via a "Connection Plan." According to one embodiment of the present invention, sometime later, at the initial execution time of an agreement, a second reaction network (i.e., a Markov matrix of service providers over the "Execution Phase" time horizon explained below) is included. Here the "Connection Concentration," i.e., the number of consumers connected to a particular service provider, replaces the "Capacity Concentration."

Providing a language for service providers to express "Load Expectation" enables application of stochastic techniques similar to those employed by a VSS's capacity management capabilities. This connection management function exploits a modeling language, leveraging an approach similar to Secchi et al., who introduced a unified language for modeling both physical plant and control software that exploits bond graphs and their mathematical formalization. Secchi et al, "Unified Modeling of Control Software and Physical Plants," 2005.

According to one embodiment of the present invention, service providers (425, 420, 430) place advance reservations to planner 400. This reserves system capacity for their use in the future. These "agreements" then coordinate planned activities against available capacity. In actual delivery of capacity against these agreements, uncertainty about the (a) availability of capacity (supply), or (b) load on a particular service (demand), gives rise to the need for a preemptive scheduling mechanism that serves a "market making" function by mediating the transfer of capacity from those with too much to those who do not have enough. This market maker function then insures liquidity, i.e., that the capacity is allocated in an optimal fashion. Hence, the problem of too much capacity for which the enterprise pays for is solved, and the potential lack of resources is controllable. As a result, the physical capacity reserved by one agent (via a "futures contract") can be transferred to another based on VSS economics:

(a) cost of retaining the capacity vs. the benefit of giving it up ("Sell-Side"),
(b) benefit of buying additional capacity vs. the risk of maintaining the current level ("Buy-Side"), and
(c) the market maker function that mediates between buyers and sellers.

Scheduler

Pre-emptive scheduler 405 is configured to execute one or more pre-arranged plans and/or unexpected conditions during the execution, thereby handling fluctuations in supply or demand within the VSS architecture. Pre-emptive scheduler 405 is configured to act in a service-specific manner to handle requests and changes in capacity on-demand to rebalance the live state of the system. Pre-emptive scheduling requires the functions of capacity management, connection brokering, state management, and monitoring.

Constraint-Based Scheduler:

For a service provider (425, 420, 430) to utilize the capacity of a VSS device, the service provider (425, 420, 430) must be granted (temporary) ownership via a "Contract." This contract is referred to in the far terms as a "Futures" contract, specifying units of capacity, the date when the capacity is to be delivered, and the unit price to be paid. The problem to be solved is two-fold: (a) the reservation problem of granting a (future) claim on capacity (see Fromhertz) and (b) calibrating the transportation of the requisite software and data against the granted reservation (which is related to the "The Transportation Problem of Linear Programming").

According to one embodiment of the present invention, at the point in time where a selection has been made as to location and the transportation of inputs is complete (i.e. software and data has been delivered), the futures contract is considered frozen. In this near term, however, there are a number of unforeseen conditions that may occur locally. In the event of such occurrences there remains a need to accommodate additional transfers of "ownership" between service providers within the site. Such a transfer is affected via the local synthesis of a new contract.

According to one embodiment of the present invention, a Markov matrix where each column in the matrix is a time interval (t) and each row is a service provider (SP) models this "preemptive scheduling mechanism". The initial state of the model, i.e. $\{SP(n), t_0\}$, is the initial concentration of capacity distributed to each service provider as specified in the governing futures contract(s). A transfer of capacity from one service provider to another is represented by the distribution of capacity in subsequent columns (i.e. time intervals).

According to one embodiment of the present invention, the switching operation of a virtual service switch is based at least in part on two papers from John Holland: Holland, "A Derived Markov Process for Modeling Reaction Networks," 2004, hereinafter "Derived", and Bellman et al, "On an Application of Dynamic Programming to the Synthesis of Logical Systems," 1959. In "Derived," Holland observes that beyond chemicals, another example of a reaction network is an economy treated as a set of activities that transform goods.

Holland illustrates how such a reaction network can be modeled as a set of Markov processes. This is done using the urn model, where an urn represents a reactant and the number of balls in an urn represents the concentration of the reactant. First, an entity within the organization is modeled as an URN, if that entity is capable of owning computation. This simply represents their "ownership" of capacity that was established in the futures market. Since the spot market is the market of immediate delivery, we assume that "the Transportation problem" has been satisfied so that each urn has been delivered their software and data. Balls in an urn represent the concentration of capacity i.e. the quantity of units owned by that urn. More balls in an urn correspond to a higher probability of reactions involving that reactant. A transfer, i.e. the sale of some of those units to another entity, is the reaction within the reaction network. These reactions are visualized by transferring balls from one urn to another. The state of the network is then the distribution of balls at a given point in time. By modeling the reaction network in this way, the result is a Markov Matrix where entries in the matrix give the reaction rates (i.e. the probabilities of the reaction).

According to one embodiment of the present invention, the futures market is implemented using a hierarchical, constraint-based scheduler that operates at three levels: (a) global, (b) site, and (c) local to a VSS device. Contrastingly, the spot market operates on control; operating locally (i.e. at the VSS device level), as an autonomous mechanism that also participates in a loosely federated, peer-to-peer network.

According to one embodiment of the present invention, this spot market is addressed via the preemptive scheduling mechanisms of the service management framework and its integration with the Message Board, described in commonly assigned U.S. patent application Ser. No. 11/410,536 to David Cohen, filed Apr. 24, 2006 and entitled "System and Method for Low Latency Market Data."

Physical Machine Controller

The PMC 410 is configured to provide for separation of hardware and data, including the software used to process that data. A VSS architecture is configured to provide a mechanism to manage the physical components with respect to the computational demands placed on the architecture. This mechanism supports a virtualization of the physical plant that composes a VSS device including compute, network I/O, and storage components. This virtualization layer is configured to provide the ability to logically separate the software infrastructure from the underlying details of the physical infrastructure and allow them to be managed separately.

Figure 5:
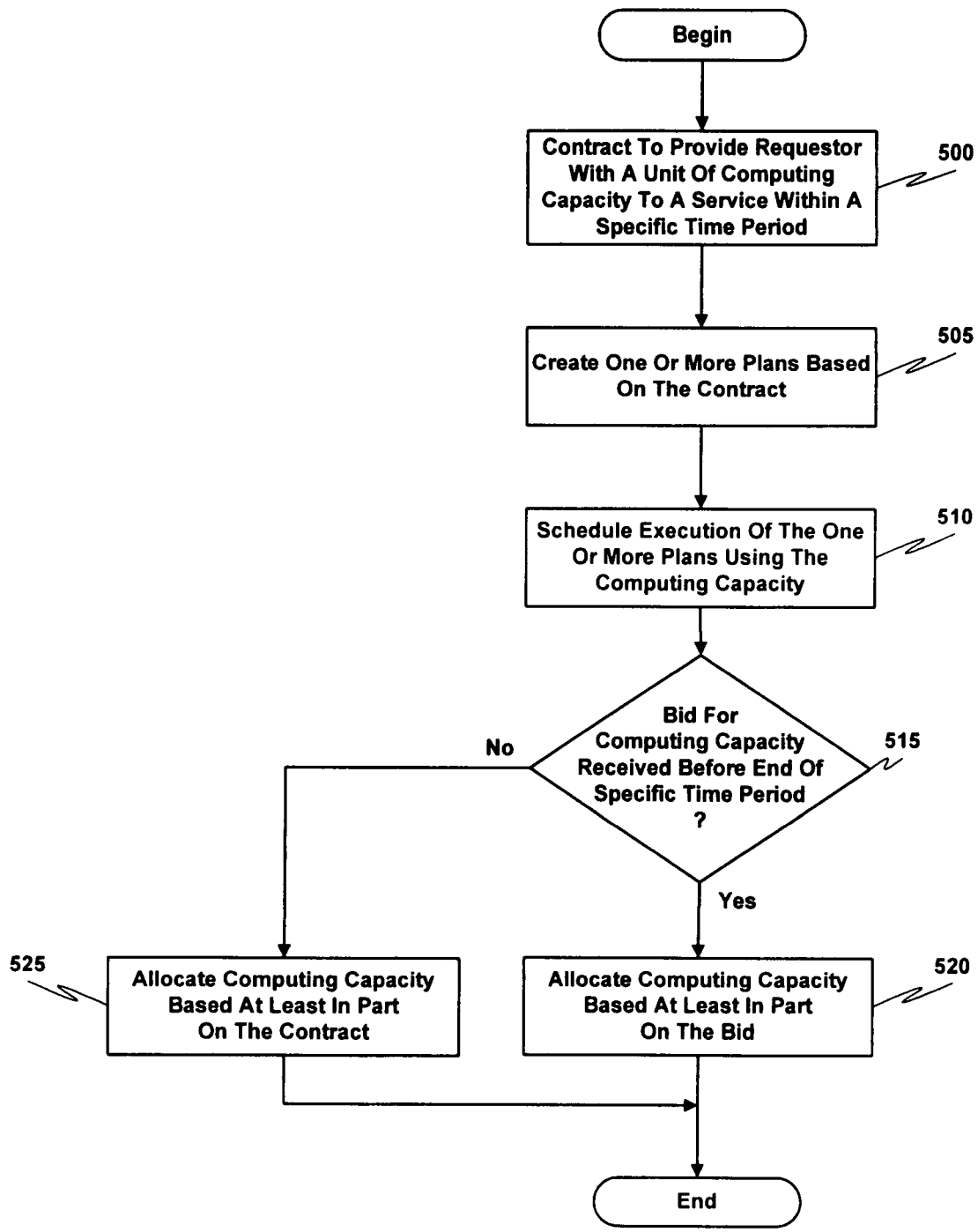
FIG. 5 is a flow diagram that illustrates a method for virtual service switching, in accordance with one embodiment of the present invention.

Turning now to FIG. 5, a flow diagram that illustrates a method for virtual service switching, in accordance with one embodiment of the present invention is presented. The processes illustrated in FIG. 5 may be implemented in hardware, software, firmware, or a combination thereof. The processes illustrated in FIG. 5 may be performed by embodiments of the virtual service switch disclosed herein, such as the embodiments illustrated in FIGS. 4 and 8-15. At 500, a contract is made to provide a requestor with a unit of computing capacity to a service within a specific time period. At 505, one or more plans are created based at least in part on the contract. At 510, execution of the one or more plans using the computing capacity is scheduled. At 515, a determination is made regarding whether a bid for the computing capacity was received before the end of the specific time period. If a bid for the computing capacity was received before the end of the specific time period, at 520 computing capacity for the specific time period or a portion thereof is allocated based at least in part on the bid. If a bid for the computing capacity was not received before the end of the specific time period, at 525 the computing capacity for the specific time period is allocated based at least in part on the contract.

Figure 6:
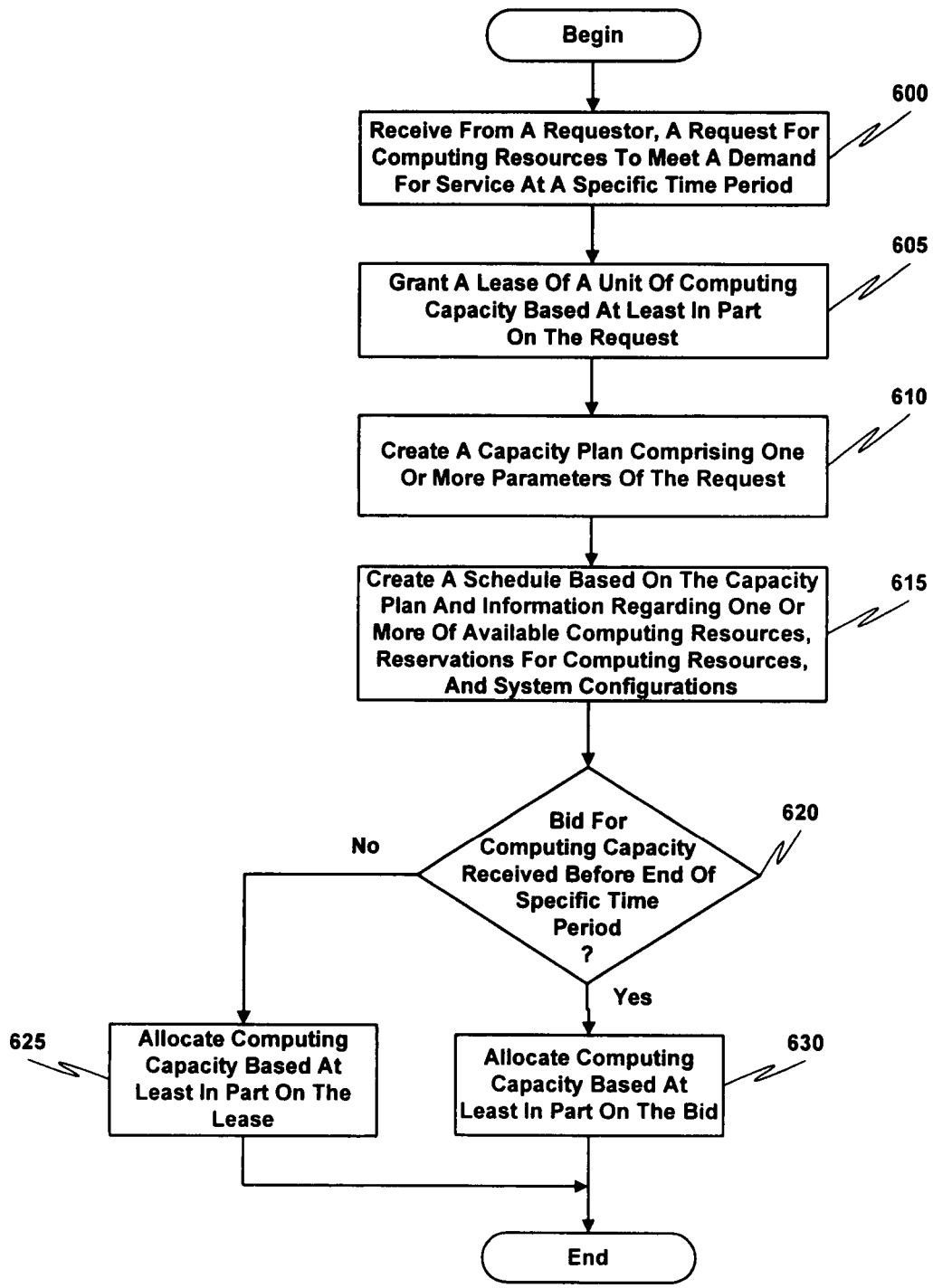
FIG. 6 is a flow diagram that illustrates a method for virtual service switching, in accordance with one embodiment of the present invention.

Turning now to FIG. 6, a flow diagram that illustrates a method for virtual service switching, in accordance with one embodiment of the present invention. The processes illustrated in FIG. 6 may be implemented in hardware, software, firmware, or a combination thereof. The processes illustrated in FIG. 6 may be performed by embodiments of the virtual service switch disclosed herein, such as the embodiments illustrated in FIGS. 4 and 8-15. At 600, a request for computing resources to meet a demand for service at a specific time period is received from a requestor. At 605, a lease of a unit of computing capacity is granted based at least in part on the request. At 610, a capacity plan comprising one or more parameters of the request is created. At 615, a schedule based on the capacity plan and other information is created. The "other information" may include one or more of the following: available computing resources, reservations for computing resources, and system configurations. At 620, a determination is made regarding whether a bid for the computing capacity was received before the end of the specific time period. If a bid for the computing capacity was received before the end of the specific time period, at 630 computing capacity is allocated based at least in part on the bid. If a bid for the computing capacity was not received before the end of the specific time period, at 635 the computing capacity is allocated based at least in part on the lease.

Figure 7:
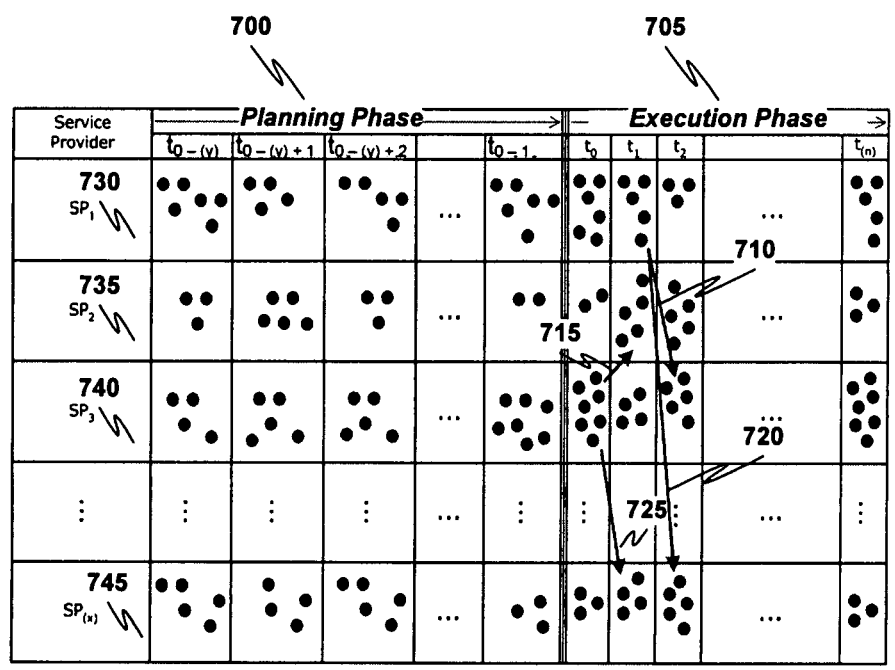
FIG. 7 is a block diagram that depicts an organization's virtual service switch network within the context of Holland's reaction network, in accordance with one embodiment of the present invention.

FIG. 7 depicts an organization's Virtual Service Switch network within the context of Holland's reaction network, in accordance with one embodiment of the present invention. During the planning phase 700, service providers 730-745 continue to optimize their plans with various constraints. Assuming a futures contract held by a service provider 730-745 is successfully executed, then the concentration distribution of capacity for all service providers 710-725 at, to, represents the initial state of the reaction network.

The reaction, i.e., the transfer of ownership from one service provider 730-745 to another, is reflected by the arrows (710-725). These transfers happen in the increment from one time interval to the next. This "transfer-of-ownership" is what makes a VSS device a switch.

In both the planning phase 700 and execution phase 705, the mechanism that allows transfer of ownership from one service provider 730-745 to another enables measurement of (a) the transfer rate and (b) the throughput as a function of the service provider's average price for capacity. Any delta in the price (i.e. premium/discount) reflects the channel's [Shannon] "relative entropy."

According to one embodiment of the present invention, a VSS/N accommodates a scale-out pattern of growth. This is done through the addition of capacity at any level of the network, not just as units of physical capacity. The topology of a VSS/N allows growth to accommodate these changes, but fit within the architecture of the system.

According to one embodiment of the present invention, all services of a VSS/N implement appropriate security. The security model for a VSS/N infrastructure itself may differ from the security model of the various hosted services.

According to one embodiment of the present invention, all components of a VSS/N are fault tolerant in order to provide the required quality of service. The components both implement fault tolerance features and rely on fault tolerant characteristics of the VSS/N environment.

According to one embodiment of the present invention, actions and events within a VSS are handled through autonomous execution of compensation processes. These processes are configurable and constrained by rational policies. Events which cannot be handled in this fashion are surfaced to an appropriate party in a timely manner.

According to one embodiment of the present invention, a VSS architecture comprises a hardware reference platform, a network topology and environment that is expected to be provided as base infrastructure for core services, and a set of software components which run within this platform and on top of which the VSS/N executes.

Figure 8:
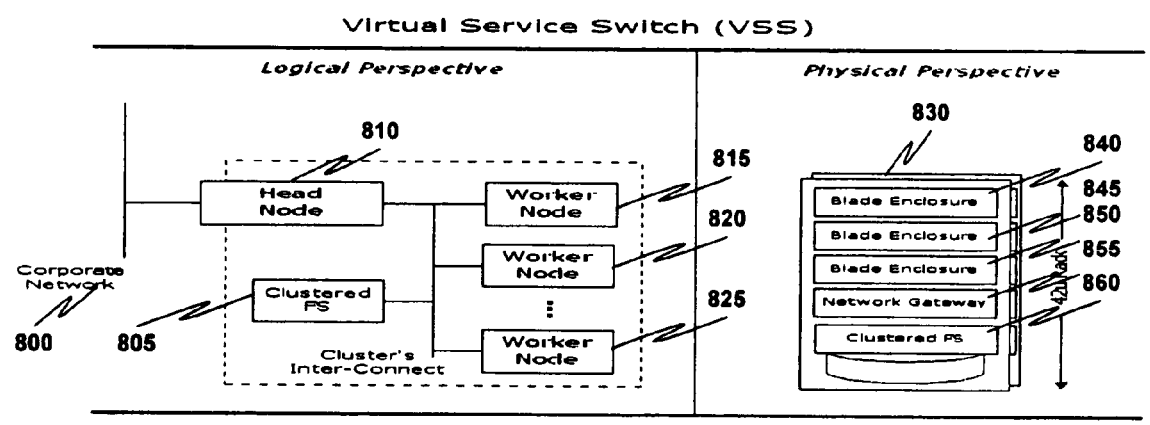
FIG. 8 is a block diagram that illustrates logical and physical perspectives of a virtual service switch, in accordance with one embodiment of the present invention.

FIG. 8 illustrates logical and physical perspectives of a virtual service switch, in accordance with one embodiment of the present invention. According to one embodiment of the present invention, the basic unit of hardware for a VSS/N is the Virtual Service Switch. Each VSS device may comprise a full-height, 48 U data center rack 830 containing elements for a rack to act as a self-sustained localized entity. Within the physical rack 830 exist basic building block elements for computation, storage, and networking. In use, these elements are organized to provide systems of resources logically connected.

According to one embodiment of the present invention, each VSS device is logically organized as a Beowulf-style cluster of resources. One or more compute nodes are designated as "head" or controller nodes 810, while other "worker" nodes (815, 820, 825) are targeted for delivering a service. The head nodes 810 contain the software elements for interacting with the VSS scheduling system, for enacting scheduled capacity reservations, and for managing the dynamic state of services operating within the VSS/N.

According to one embodiment of the present invention, a VSS device's compute elements comprise one or more blade enclosures (840-850). When fully populated, a blade enclosure (840-850) contains between 12 and 16 blades as well as redundant switch modules. A blade is a 2- or 4-socket computer in a high-density form factor. A socket comprises (a) single, (b) dual, or (c) multi-core(s) processors. According to one embodiment of the present invention, one or more blades are "Diskless". According to another embodiment of the present invention, one or more blades comprise a tactically locally attached disk.

According to one embodiment of the present invention, a VSS device's network element serves as an isolated, rack-level interconnect. The switch modules within the blade enclosures of the Compute and Storage Elements are connected into redundant Network Gateways 855 that are, in turn, connected to the data center's core networking fabric 800.

According to one embodiment of the present invention, a VSS device's storage element comprises two or more head nodes 810 or an additional blade enclosure along with a storage array. This storage array is provided as a shared, clustered file system (805, 860). Access to this shared storage pool (805, 860) is limited to services within the rack 830. For a VSS architecture, storage is treated as a two-way cache.

Network Architecture

Figure 9:
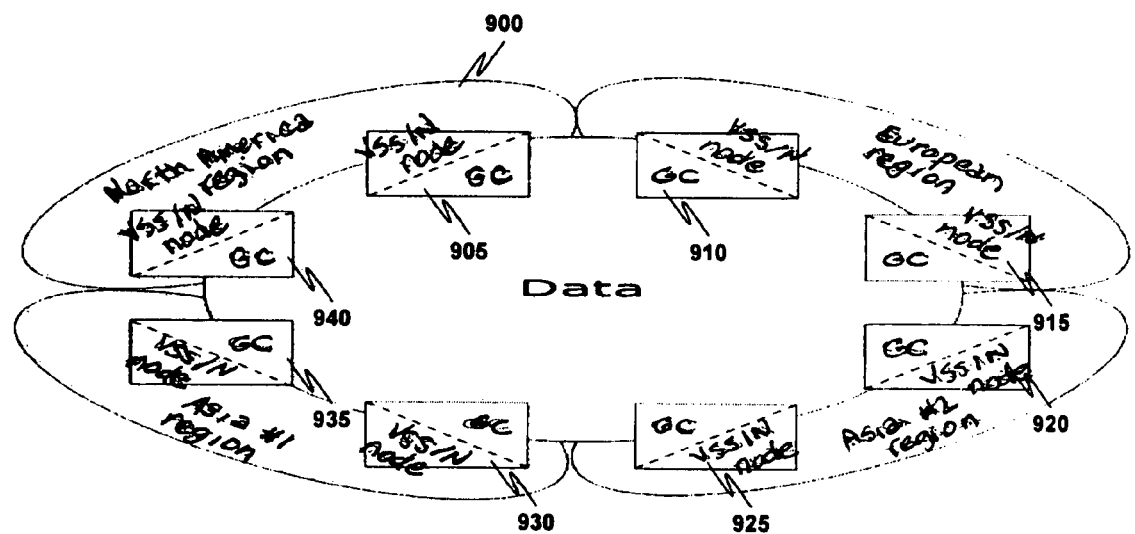
FIG. 9 is a block diagram that illustrates several virtual service switch network nodes in a corporate network in accordance with one embodiment of the present invention.

FIG. 9 is a block diagram that illustrates several virtual service switch network nodes in a corporate network in accordance with one embodiment of the present invention. According to one embodiment of the present invention, the Virtual Service Switch lives within a corporate network 900. As such, it reflects the existing topology and requirements of the network.

According to one embodiment of the present invention, a VSS/N is hosted on: one or more physical instances of VSS devices (905-940) within this network 900. Within one region and one data center, these components may resemble a hierarchy of devices. Functions of the unified portal and global scheduling are provided at the enterprise level. At the data center level, infrastructure services and meta scheduling services are provided. Finally, at the VSS device level, individual services are managed and operate.

Figure 10:
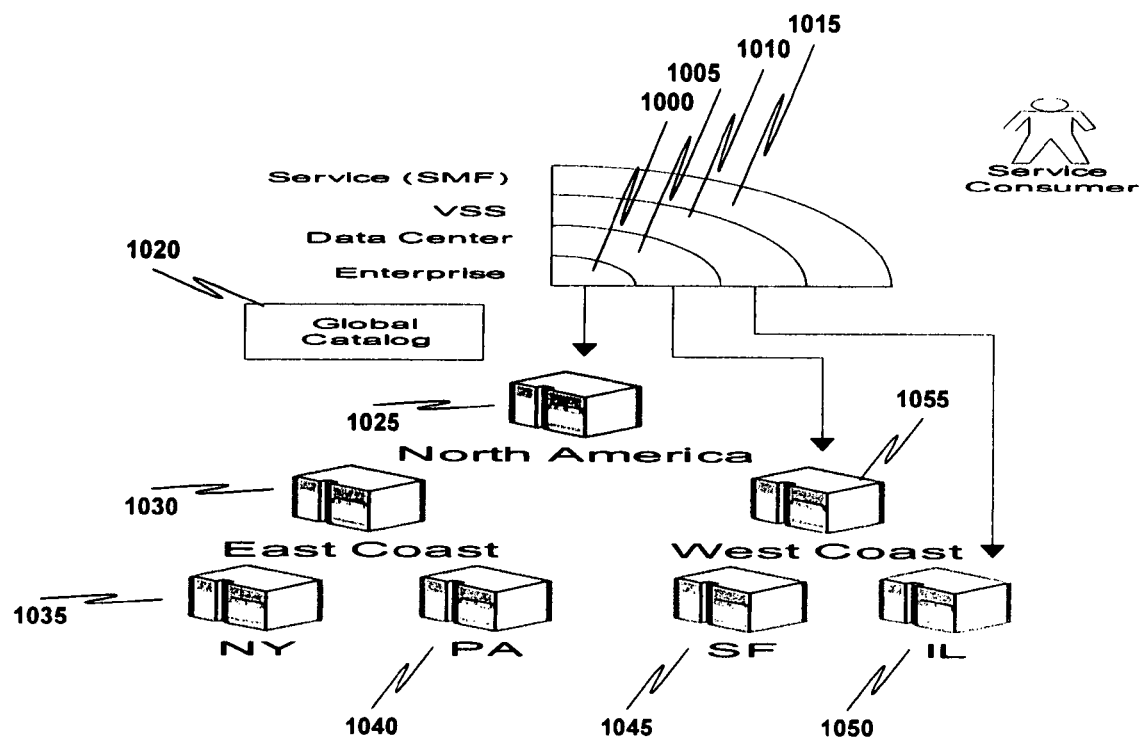
FIG. 10 is a block diagram that illustrates a service management framework in accordance with one embodiment of the present invention.

FIG. 10 is a block diagram that illustrates a service management framework in accordance with one embodiment of the present invention. A VSS/N may be visualized as a series of concentric rings of services (1000, 1005, 1010, 1015) superimposed on the backbone of a corporate network. According to one embodiment of the present invention, the VSS/N has a single logical instance at the Enterprise level 1000.

Still referring to FIG. 10, a global catalog (GC) 1020 is configured to provide a global view of the entire state of the corporate network including 41 of its data and software assets. The command and control infrastructure drives actions into outer rings (1005, 1010, 1015).

According to one embodiment of the present invention, the GC 1020 is the authoritative source of all persistent state available within the network. The GC 1020 is for use in managing the life cycle of an organization's data over the long-term. In this context, data moves between the GC 1020 and VSS nodes in a two-way flow. Data flowing out of the GC 1020 is read-only, "immutable" state while data flowing into the GC 1020 is transactional state that was created in the VSS network and must now be persisted.

To facilitate access to this state, according to one embodiment of the present invention, the GC 1020 exposes a single, authoritative namespace to nodes in a VSS network. It also promotes the use of a policy-based governance model; allowing policies to specify how state is moved in and out of the GC, how it is replicated, etc. To enable this "data movement" the GC 1020 is configured to provide mechanisms for policy enforcement and orchestration. These GC 1020 services are consumed by the scheduling capabilities of the VSS network.

According to one embodiment of the present invention, the GC 1020 maintains the underlying model of a VSS/N and authoritative descriptions entity types such as the following:

Physical Resources—The GC 1020 stores descriptions of individual VSS devices and their capabilities. Resource definitions are created in a top-down fashion starting, initially, with a manifest provided by the hardware vendor.

Persistent Files—The GC 1020 maintains a versioned repository of all file-based data that may be staged into and out of a VSS. Exemplary Staged-In files include OS images or VM guest images. Exemplary Staged-Out files include log files.

Service Descriptions—In order to determine how to implement capacity requests on a pool of resources, the Planner must have a template that describes in a general way the resource composition of a service. The service description is configured to provide this template. This compositional approach is used to describe, configure, and manage all services within the VSS network. Each service to be deployed and its constituent parts are grouped together within a deployment container. This container is described by a loose hierarchy of individual components responsible for deploying and configuring some element of the service. Templates of services are composed to create a final system instance. This allows each component to be managed separately and coalesced uniquely to form a complete system to be put into service.

Capacity Requests/Capacity Plan/Exception Policies—The GC 1020 is also the repository of the individual capacity requests, the resulting capacity plan, and any associated demand and capacity policies.

According to one embodiment of the present invention, the GC 1020 also presents interfaces through a unified portal for maintenance of the catalog data.

Still referring to FIG. 10, at the VSS device level 1010, the service management framework 1015 enables a service to be performed locally within the resource allocated from the VSS/N, but ensure that the service instance is part of a single logical entity, such as the virtual desktop service. This logical regrouping abstracts the service consumer from the topology of a specific service, while providing redundancy and global-scale fault tolerance.

According to one embodiment of the present invention, VSS/N Enterprise and data center components are statically configured to run on one or more servers, which may be separate from the VSS/N, or may be carved out of one or more of the VSS devices. The components running at the Enterprise level 1000 and the data center level 1005 may have redundant physical instances to provide complete fault tolerance.

Directory Services

According to one embodiment of the present invention, the core of the corporate network utilizes Microsoft Active Directory for identity and security services. There are a predetermined number of primary sub-domains covering the basic geographic regions (1025-1055) of the world. The VSS leverages this organization and resource domains are created as children of each of these regions (1025-1055). This allows a VSS/N to be controlled independent of the remainder of the corporate directory. Alternately, organization units could be created within each region (1025-1055) for the same purpose.

The functions of a VSS Network require the ability to create/delete and control elements within the directory. At a minimum, within each resource domain, an account is created with delegated administrative rights. The account has group assignment privileges, the machine account creation/join privilege, as well as read access to the core of the corporate directory. Additionally, several groups are created in each domain to reflect operational and administrative roles within the VSS Networks as well as for the purpose of basic service authorization. If it is desired to be able to assign and authorize services from within the unified portal, the administrator or the above account must also have rights within the primary corporate network sub domains.

Network Topology

According to one embodiment of the present invention, within each data center that is a member of a resource domain, two DCs and two GCs are placed. AD Sites and Services are configured to create both replication topologies and subnets to further define each of these regions. Microsoft DNS is utilized, with the netmask ordering function enabled to provide first order placement of connections into a VSS/N. This ensures that users are attached to machines in the correct region and data center.

According to one embodiment of the present invention, Internet protocol (IP) address pools are created within each data center to accommodate the addressing needs of a rack. Each rack runs its own independent dynamic host configuration protocol (DHCP) service, using IP addresses from this pool. However, domain server (DNS) is done at the data center level, including the use of dynamic domain service (DDNS), thus all endpoints within a VSS can reach DNS services.

Software Architecture

Providing the desired VSS/N functionality requires a number of functions working in concert to plan and deliver services. Software components providing the VSS/N functionality, the organization of the system, and the major system processes are described in more detail below.

Functional View

Figure 11:
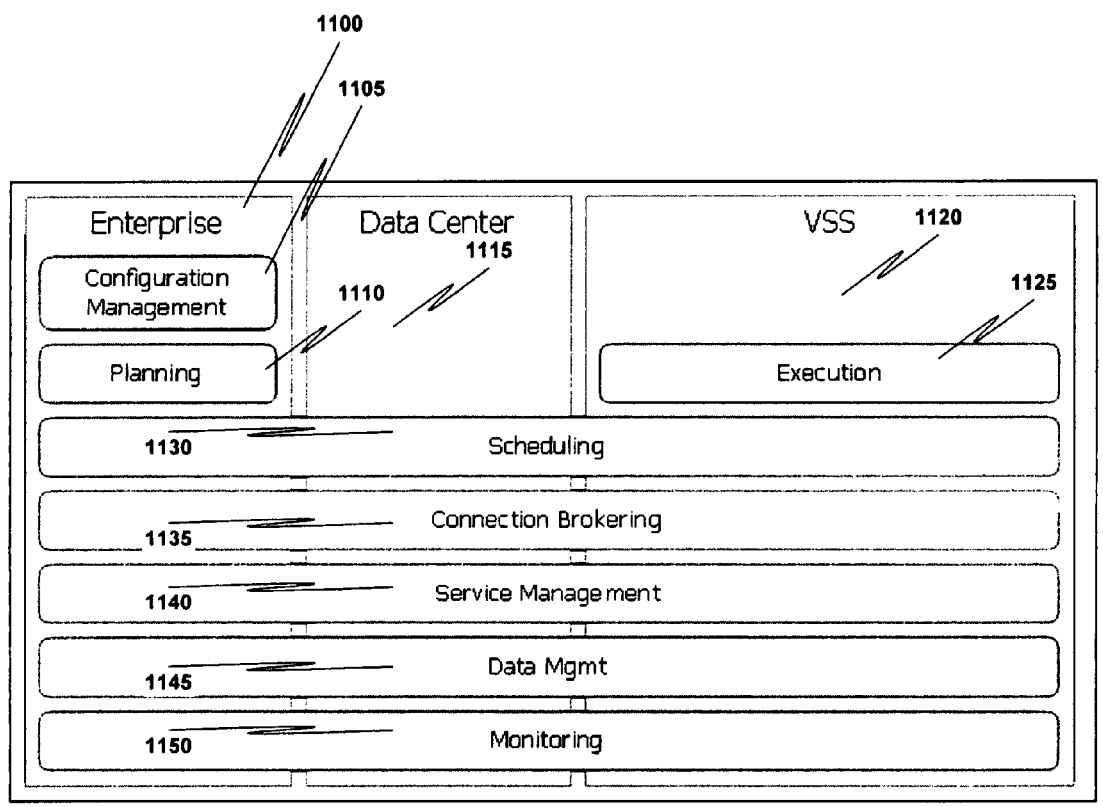
FIG. 11 is a block diagram that illustrates a functional view of virtual service switch components, in accordance with one embodiment of the present invention.

The capabilities of the VSS/N components in accordance with embodiments of the present invention can be viewed functionally. FIG. 11 is a block diagram that illustrates a functional view of virtual service switch components, in accordance with one embodiment of the present invention. As illustrated in FIG. 11, some functions are performed at a single level, while other functions span from the Enterprise to the VSS. The spanning functions may present different behaviors at each level. These functions are described and explained in more detail below.

Configuration Management

According to one embodiment of the present invention, the VSS architecture is a distributed service network wherein there is presumed to be a significant variance in configuration and lifetime of the services in operation. Deploying and managing any large distributed system can be difficult. In order to realize the benefits of a VSS architecture, the system is configurable in the aggregate but manageable down to its most precise details.

According to one embodiment of the present invention, in order to instantiate various services onto VSS compute nodes, a VSS/N has a catalog of resource and service descriptions. Service descriptions are service-specific templates that can map service capacity requirements (e.g. based on connection forecasts) to specific resource capacity requests. A resource capacity request comprises both a description of what resources are needed (e.g. N physical computers of a specific type, M virtual machines of a particular configuration, etc.), and a description of the initial tasks to be enacted on the resources (e.g. boot the machines with specific operating system (OS) images and server configurations).

According to one embodiment of the present invention, configuration management 1105 is responsible for the creation and management of these resource and service descriptions. The VSS/N need not include tools for creation of OS images. Instead, this activity can take place out-of-band. However, VSS/N configuration management 1105 includes support for loading and describing OS images and other service related data into the repository, which can in turn be used by service descriptions. Configuration management 1105 also maintains information about service-level policies for handling changes to available capacity and excessive or insufficient demand. Configuration information 1105 is loaded into the system through the unified portal and stored in the global catalog for use by the planner and global scheduler.

Planning

According to one embodiment of the present invention, a service manager (an entity responsible for providing a service to a user community) initiates the planning function 1110 based on a forecast of service demand. This demand is expressed to the VSS/N as a series of requests for service capacity, comprising a certain class of service, in a certain location (either concrete or abstract), for a certain period of time. Acceptance of capacity requests is done by a (human driven) process, supported by capacity planning tools. The union of all accepted requests becomes a capacity plan.

The planner assists in the capacity plan acceptance process, and then creates the capacity plan from user requests entered through the Portal and information stored in the global catalog. The capacity plan is pushed to the global scheduler for implementation through the data center and local schedulers.

Scheduling

According to one embodiment of the present invention, the scheduling function 1110 manages the translation of the capacity plan to the schedule that defines how the physical resources of a VSS/N are to be allocated to particular tasks over time. Scheduling 1130 continuously manages the resource pool to match the schedule, while also supporting the ability for the schedule to be modified by external influence while preventing or signaling any schedule inconsistencies.

According to one embodiment of the present invention, a VSS/N uses a top-down approach to scheduling 1130 which is policy driven for planning purposes but allows for local control at each level to deal with failures and provide responsiveness to 'spot market' decisions. Local control is defined by specifying which services have authority for capacity allocation.

According to one embodiment of the present invention, the scheduling function 1130 is driven by the input of a capacity plan from the planner and by dynamic capacity requests from service agents. The global scheduler implements the plan by driving schedule information down through the data center scheduler to the local scheduler. On a VSS itself, actions may be driven from above or handled entirely locally by the local schedulers. All of the schedulers use various Controllers to perform scheduled tasks.

Execution

According to one embodiment of the present invention, execution 1125 is the interface between scheduled tasks and VSS/N operations. Execution activities are driven by scheduling and service management requests. Exemplary activities include powering on a physical node, starting up virtual machine, and staging OS images and service data between the global catalog's repository and VSS devices. The capabilities required of execution 1125 become increasingly diverse as the number of hardware and software configurations supported by a VSS/N grows. To handle this growth, execution 1125 is delivered through a flexible structure that supports the easy addition of capabilities.

According to one embodiment of the present invention, execution 1125 is provided by an enactment engine, which is configured to provide the container for various controllers and presents an interface that is used by schedulers and service agents. The enactment engine hosts various controllers that are each responsible for actions on a particular resource types. There are controllers for physical machines, virtual machines, data, and other resource types.

Service Management

According to one embodiment of the present invention, service management 1140 is configured to provide a link between a service running on the VSS/N infrastructure and the management capabilities of the VSS/N, as well as a link between a service and its consumers. Service management 1140 encompasses general capabilities that are required by all services and specific agents that act on behalf of a single service. Service management 1140 ensures that capacity meets demand and that demand is appropriately distributed across available capacity. At any time, demand may be above forecast or a failure may occur in a component of the scheduled capacity.

Service management 1140 also efficiently mediates requests for service with available capacity. An individual service request is matched to a best-fit provider of that service if sufficient capacity is available. As each service and class of service will differ, service agents have the ability to execute service-specific optimizations to the request brokering function.

According to one embodiment of the present invention, one or more service management functions 1140 are provided to each service by service agents. The service management framework is configured to provide the runtime environment and services required by the service agents and the planning time policy options for each service. The service management framework enables exchange of capacity between services to handle pre-emptive capacity demands, as well as drive additional capacity requests into the schedulers for long-term overflow conditions.

Connection Brokering

According to one embodiment of the present invention, connection brokering 1135 is the interface between a service consumer and a service provider, mapping user requests at a well-known address to specific service instances that can handle the requests. Connection brokering 1135 occurs logically at the enterprise-level to allow users access to any appropriate service instance across the enterprise that can service the request. The information required to broker user requests to an appropriate instance is shared though service management between all service instances. Connection brokering 1135 is conducted by an individual service agent leveraging the distributed services of the systems management facility (SMF) in conjunction with address mapping functions provided by DNS. Each service agent implements this interface.

Resource Management

According to one embodiment of the present invention, the resource management function handles the mapping between scheduled capacity and the actual resource pool that has been enacted. It coordinates the workflow of service instantiation as well as handling runtime events that could cause a change in the state of a service.

In the case where a service failure occurs, a service agent detects the problem (via a combination of monitoring it is configured to provide of the service, combined with monitoring available from the local scheduler) and handle the requests according to service policies defined during planning. Depending on the policy, the service exceptions may be handled by re-routing connections to another available instance, requests to a virtual machine (VM) scheduler for additional VM capacity, to a local scheduler for additional physical capacity, or by alerting the (human) service manager.

The service manager may then take appropriate remedial action. If the VM or local scheduler can provide the capacity, the request follows normal channels and results in an eventual grant of capacity to the requesting service agent.

Data Management

According to one embodiment of the present invention, since a VSS is configured to provide for no persistent state, all data consumed and produced by services on the VSS is staged between the VSS and the global catalog's persistent data repository. Data management 1145 performs this service under the control of scheduling. In one scenario, Data management 1145 copies an OS image and other service-related data from the repository to VSS storage during the Stage-In phase (so that it is available locally on the VSS to be booted), and then copy log files and other service-related data from the VSS to a repository during the Stage-Out phase.

According to one embodiment of the present invention, data management 1145 is under the control of the local scheduler, and is enacted through the Data Controller. The data controller actually services data management requests using GridFTP and RFT.

Data management functions are described from the perspective of a job's requirements and include:
  Data movement necessary prior to the job being initiated (Stage-In),
  Data availability during job execution, and
  Data movement required after job completion (Stage-Out)

According to one embodiment of the present invention, the storage subsystem on a VSS device is stateless. Jobs submitted into the VSS device have certain expectations of availability for system, application and user data. This implies that jobs are actually a sequence of actions that must be enacted in a prescribed order with defined failure modes (and compensating actions where necessary).

According to one embodiment of the present invention, scheduled jobs contain information on what data needs to be available on the VSS device in order for the job to execute successfully. This requirement causes the scheduler to trigger the appropriate actions for staging the data on the VSS device, taking into account latency so that schedule timing is not compromised. Implicit in this step are assumptions regarding storage capacity and bandwidth allocation to ensure that the staging request is successfully serviced. This requires that jobs submitted into the VSS device should have all constraints adhered to via scheduled actions by creating reservations for capacity, bandwidth, etc., rather than relying on "best effort" approaches.

According to one embodiment of the present invention, stage-in is managed by an out-of-band mechanism that allows the OS image and application files required for a job to be replicated to all VSS devices. Jobs check to ensure that the data is indeed available on the local storage subsystem prior to executing, and raise an exception if the input data constraints are violated. User data is assumed to be available during execution via network accessible storage that is outside a VSS. The only data that is created locally on the VSS device storage is log files. Post-execution staging performs best-effort staging of these log files from VSS device storage to the global catalog.

Monitoring

According to one embodiment of the present invention, monitoring information 1150 in a VSS/N is used to establish the device state for failure detection, to evaluate the device performance, and to provide an audit trail of system events. To support these purposes, the VSS/N captures monitoring data for all relevant levels of the system, and propagates monitoring information to the various consumers that require it. This monitoring information is used for a variety of purposes, including: to implement feedback loops for automated action on occurrence of defined conditions, for forensic analysis of failure, for adapting future capacity plans, and for management consoles.

According to one embodiment of the present invention, VSS components such as physical and virtual machines contain local monitoring agents that communicate with the VSS-level monitoring agent. The monitoring agent implements a standard publish-subscribe model that is used by service agents and local scheduler to create a feedback loop for policy-based automated responses to system changes. Filtered monitoring information is also available through the unified portal.

Component View

Figure 12:
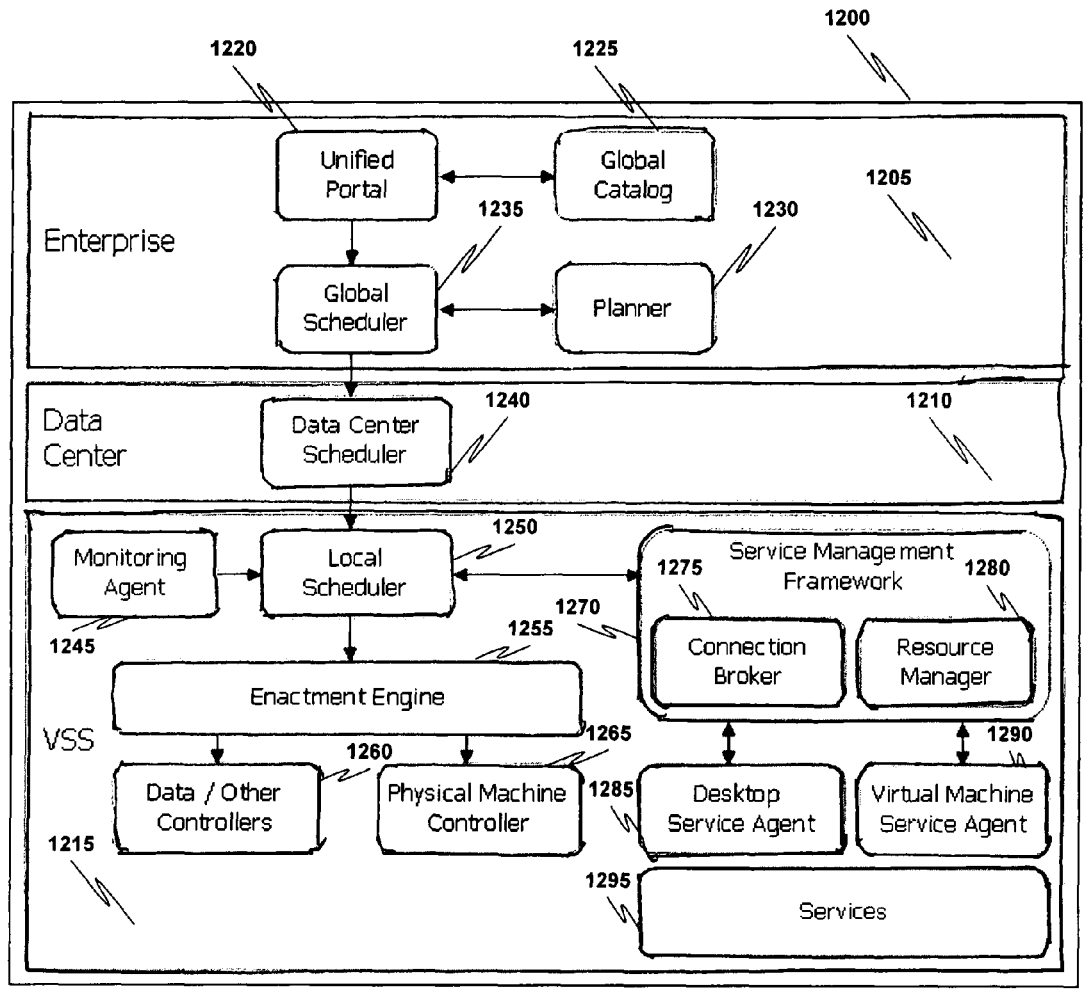
FIG. 12 is a block diagram that illustrates a component view of a virtual service switch, in accordance with one embodiment of the present invention.

According to one embodiment of the present invention, the functions described above are provided by the various components of a VSS/N shown in FIG. 12. Architecturally, these components are shown both at what level it operates and as part of what vendor's products it is associated. Each of these components is described in further detail below.

According to one embodiment of the present invention, a VSS/N comprises a unified portal 1220, a global catalog 1225, a planner, a global scheduler 1235, a data center scheduler 1240, a local scheduler 1250, a physical machine controller 1265, data/other controllers 1260, a service management framework 1270 comprising a connection broker 1275 and a resource manager 1280, a virtual machine service agent 1290, a desktop service agent 1285, services 1295, and a monitoring agent 1245.

Unified portal 1220 is configured to provide a single management console that implements the standard web portal/portlet model. All control functionality of the VSS/N is accessed through unified portal 1220. The portal implements a portal/portlet model that allows for integrated presentation of VSS/N functionality. The portal is configured to provide the capabilities to manage the VSS architecture from service class definition, hardware identification, scheduling, monitoring, and overall policy management within the VSS environment. In more detail, the portal interface surfaces portlets for:

- Configuration Management—Maintenance of resource and service descriptions, service descriptions, image files, and associated meta-data
- Capacity Planning—Entry of capacity requests and viewing of capacity plans.
- Service Policies—Setting of policy options by service for handling of various demand and capacity scenarios.
- Monitoring—Viewing of system and service state at appropriate levels of detail.
- Exception Handling—Viewing of exception details and problem resolution capabilities.
- Service Configuration—Maintenance and configuration of service and instance specific elements.

Global catalog 1225 is configured to store the persistent state of the VSS/N—including capacity requests, the capacity plan, resource and service descriptions and configurations, and the persistent file repository.

Planner 1230 is configured to accept one or more capacity requests and produce one or more capacity plans. In addition to a model for resources required to provide the capacity, the one or more plans include policies for exception handling (failures, over- and under-use, etc.) that are implemented by each service agent.

According to one embodiment of the present invention, Planner 1230 is further configured to grant an individual application owner the privilege of buying an "option" to receive additional capacity at a specified future date (and duration), thereby accommodating the individual application owner's uncertainty regarding capacity.

According to one embodiment of the present invention, the scheduler comprises a number of discreet scheduling entities that may be clustered at each level for high-availability. The three levels of scheduler operation are: global scheduler 1235, data center scheduler 1240, and local scheduler 1250.

The scheduler (1235, 1240, 1250) orchestrates the complex interactions between capacity plans, service agents, and physical execution at the enterprise, data center and VSS levels. Its central mission is to implement the plan, while negotiating and unplanned requests or failures. It also carries out a distribution of schedule information from the global level to the data center and local levels, permitting autonomous action at lower levels for management of local conditions and independent operation in the case of network failure.

Each scheduled allocation of resources is considered a job, which is the representation of a task in the schedule. Jobs are defined as having an execution stage that may be preceded by stage-in and followed by a stage-out. Tasks are performed during stage-in and stage-out in an effort to guarantee that conditions for the execution are met, e.g. staging of image data on VSS device local storage prior to execution and persistence of transactional data to the GC after execution.

The global scheduler 1235 is the interface point for the capacity plan and is independent of a specific location. Plan information flows down from the global scheduler 1235. Global scheduler 1235 is configured to accept a capacity plan from the global catalog 1225, create a global schedule from the plan, and manage the distribution of the schedule to the data center schedulers 1240.

According to one embodiment of the present invention, global scheduler 1235 meters (i) demand for an individual application in terms of "Connection Requests Over Time," (ii) load in terms of {Temperature, Pressure/Flow, Volume}, and (iii) capacity in terms of plan.

According to one embodiment of the present invention, applications are granted the privilege of subleasing capacity under their control. This allows global scheduler 1235 to provide pricing incentives so that an application experiencing less demand than expected can unload the excess to reduce their cost. Conversely, if an application (or global scheduler 1235) finds they need more capacity than expected, they can satisfy their short-term/variable needs in a market (provided via global scheduler 1235).

Data center scheduler 1240 is configured to distribute the schedule to the VSS local schedulers 1250, and data center level 1210 response to capacity needs. Data center scheduler 1240 is primarily an intermediary between the local scheduler and the global scheduler 1235. It also has visibility to a capacity pool that may be used to handle 'spot market' requests without disrupting the capacity plan.

The local scheduler 1250 is part of the core stack of the VSS device. Local scheduler 1250 is configured to enact the schedule on the VSS by preparing data, services, and physical devices. It interacts with service agents and the Controllers to make the schedule real. Local scheduler 1250 is configured to drive tasks such as data staging, service agent instantiation, and physical power on/off. Local scheduler 1250 is further configured to act as a purely local scheduler, handling requests for physical resources driven by the Service Management Framework and the needs of a particular service. Local scheduler 1250 has knowledge of advance reservations from the capacity plan and can also handle local 'spot market' requests from any excess capacity.

According to one embodiment of the present invention, the capacity plan "flows down" the scheduling hierarchy, from the global scheduler to the local and VM schedulers, but each scheduler has the ability to make adjustments to local conditions and attempt to manage exceptions autonomously. Some level of autonomy is bestowed to a VSS, meaning that the data center scheduler cedes control over unused capacity to the local schedulers which can then act autonomously (to some limited degree) in servicing "spot market" requests from services.

Enactment engine 1255 is an administrative service that resides on a VSS. Enactment engine 1255 is configured to translate a scheduled task into a set of concrete actions that result in physical machine capacity being made available to service agents. Enactment engine 1255 hosts various controllers, which are responsible for the control of various hardware and software components of the VSS/N.

The framework implemented by the enactment engine supports 1255 the relatively simple integration of additional controllers for additional resource types and additional plug-ins for resource subtypes (e.g. new hardware platforms).

Physical machine controller 1265 is configured to bring physical machines from bare metal to a full personality (including OS and network) and back again. According to one embodiment of the present invention, physical machine controller 1265 is responsible for all aspects of bringing a node from base metal to networked node. It includes a number of plug-ins to handle OS images, networking control with DHCP, direct hardware control with PXE (Preboot eXecution Environment), etc. In operation, the physical machine controller 1265 accepts a declarative node description and takes operations to instantiate that node. The physical machine controller 1265 is adapted to bring up multiple nodes in parallel by broadcasting needed data into all nodes at once. The physical machine controller 1265 is also adapted to create both "diskfull" and "diskless" nodes.

Data/other controllers 1260 are configured to perform data staging and service agent instantiation. According to one embodiment of the present invention, the data controller 1260 is for use by schedulers to drive data staging activities. For example, the data controller 1260 may stage OS images from the global catalog down to a VSS for use by the physical machine controller. The data controller 1260 drives all data transfer to and from the VSS.

Service management framework 1270 comprises a connection broker 1275 and a resource manager 1280. Service agents residing in the Service Management Framework (SMF) are configured to manage each hosted service. The framework is instantiated on each VSS and is configured to provide distributed coordination of service agents, allowing all physical service instances to act together as a single logical service.

According to one embodiment of the present invention, the service management framework 1270 is a component specifically designed to allow multiple services to run simultaneously; sharing the same underlying VSS infrastructure. This means that an "Order Entry Portal" and a "Virtual Workstation" service could be running concurrently on the same VSS device. Each service is allocated to a subset of resources in a VSS device. To accomplish this, the SMF 1270 defines how a service is integrated into the VSS architecture.

According to one embodiment of the present invention, the service management framework resides within a VSS and is configured to provide several basic elements for all service agent instances to leverage in order to control a service. Fundamentally, the SMF 1270 is a distributed hash table (DHT) based loosely on the Bamboo/Pastry pattern. This function enables all service agents to share information about the capacity within their control and perform operations across the entire population.

According to one embodiment of the present invention, the SMF implementation is a peer-to-peer architecture including built-in information replication, distributed querying support, routing, etc. Building upon the DHT, the SMF 1270 is configured to provide three core services: connection brokering, resource management, and conditional access security.

Connection broker 1275 is configured to mediate all services is mediated through a proxy to a service instance. The agent responsible for a particular service is configured to provide the algorithm for distributing connections. Each agent is configured to use the built-in services of the SMF to perform the load management function.

According to one embodiment of the present invention, the connection broker 1275 exposes the capability to the system of locating service endpoints appropriate to the service port the broker is assigned to handle. The connection broker 1275 is configured to provide a basic entry point into the system. This entry point can validate the connection credentials, identify a service request, and route to a service agent. In some instances, it can be a proxy to the service agent interface to generate service tickets for use with the appropriate service. This function is only used in configurations where the connection broker 1275 and service agent are single homed for efficiency.

Either a qualified or blind connection to the connection broker 1275 can be made. A qualified connection specifies exactly the type of connection requested with full QoS parameters. A blind connection requires lookup of the service credentials to identify the requisite parameters to locate the correct service endpoint. As an example, if a DSA has a scope to manage a rack of machines that is mixed operating systems and configurations, it must be able to multiplex across these resources and properly identify the correct resource for a connection request.

Resource manager 1280 is configured to manage a VSS resource to ensure its availability and capability to meet service policies. Each element of a capacity plan is configured to map to a resource within a VSS, and pool of resources within the VSS/N. Its lifecycle is coordinated with the local scheduler 1250 and appropriate controller function.

According to one embodiment of the present invention, a service agent is configured to provide the ability to control the lifecycle of its constituents. It enforces the policies of the service, assists the connection broker mechanism in mediating access to the service, and interacts with the scheduler to ensure a scheduled service is adequately provided. The SMF 1270 is configured to provide policy driven control of a service through the definition of lifecycle actions. This enables feedback to be provided to the scheduler, scalable failure handling, and the ability to enforce service quality constraints. Many service agents will have the need to communicate or observe the conditions of services that span more than one VSS device. The SMF 1270 is configured to provide these peer-to-peer communication services as well as distributed querying, location and monitoring capabilities.

The SMF 1270 leverages the distributed peering of service agents to assist with failover capabilities. A service agent registers its endpoints such that they can be notified in the event of failure, and can be reconnected to another agent node. The service agent does not retain service/node state information, but does enable it to be required on recovery.

According to one embodiment of the present invention, The SMF uses the Microsoft Active Directory implementation of Kerberos for its primary AAA source. This requires all clients to authenticate with the directory, and obtain an appropriate service tickets. These tickets are then used to access service agents, which sign an access ticket. These access tickets can be later verified with the SMF.

Virtual machine service agent (VMSA) 1290 is configured to partition the capacity of a physical machine into one or more logical, virtual machines. Virtual machine service agent 1290 presents an interface that is used by other service agents to access and manage these virtualized resources. Virtual machine service agent 1290 is also configured to respond to physical failures by requesting and receiving additional physical capacity.

VMSA 1290 is responsible for the overall management of the machine virtualization services. VMSA 1290 manages a VM capacity plan on behalf of other services. VMSA 1290 handles runtime exception conditions in the context of a capacity plan with associated policies. Each VMSA 1290 acts purely locally. It only has visibility to a pool of VMs on a single VSS. It can handle responses by making requests from a local scheduler, but cannot push demand off to another instance.

According to one embodiment of the present invention, VMSA 1290 is configured to manage virtual capacity within the confines of physical capacity that it has been granted. VMSA 1290 is configured to manage the grant of a pool of virtual machines for a particular virtual machine service request as well as the interaction between a hypervisor and an interested Service. It also has further features to support migration as needed to occasionally consolidate services for more efficient use of capacity. VMSA 1290 also is configured to provide one or more interfaces for monitoring of the hypervisor and the virtual machine grants as they relate to a specific service request.

Desktop service agent (DSA) 1285 is configured to interact with the VSS/N infrastructure for the purpose of delivering and managing the quality of service of the virtual desktop service. DSA 1285 runs within the service management framework for each service supported by a VSS. DSA 1285 is responsible for the basic lifecycle of the service(s) that it manages, providing endpoints for connections to clients, hosts and other services within the infrastructure. DSA 1285 is responsible for controlling all access to virtual desktops within and across VSS devices. DSA 1285 is configured to manage the inventory of virtual desktop instances. As clients request the use of the service through the connection broker, DSA 1285 allocates an available desktop and removes it from the pool. Once connected, DSA 1285 manages a state machine for each desktop connection. This allows the network to be resilient to intermittent connectivity, and exhibit basic hysteresis in service deployment.

According to one embodiment of the present invention, the virtual desktop service is provided using the Remote Desktop Protocol (RDP). A client may attempt to directly access a desktop instance simply through activating a standard RDP client. It is desirable to prevent this in order to ensure a client connects to an appropriately provisioned endpoint, as well as to mandate a sufficient security model.

VSS Services

One goal of the VSS architecture is to provide computational services by decoupling the application or technology that is configured to provide the service from the physical components that support the service. As a result of this, a commodity based system is defined which allows different services to be scheduled, executed, and then torn down within the physical VSS environment as the supply and demand model dictates. The support of a specific service depends on the service components to support the specific service.

According to one embodiment of the present invention, services 1295 comprises a virtual desktop service configured to provide desktop operating systems running within a VSS/N, logically partitioned amongst VSS devices. The virtual desktop service runs on top of a machine virtualization service that is delivered as part of the system. End users dynamically access their individual "workstation" remotely from amongst a pool of service elements.

According to another embodiment of the present invention, services 1295 comprises high performance computing (HPC).

According to another embodiment of the present invention, services 1295 comprises a virtualization service configured to provide the capability to enact a virtualized environment within a VSS device. The Virtualization Service is configured to manage the scheduling and management of a virtual machine within the framework of a schedule.

According to another embodiment of the present invention, services 1295 comprises desktop services configured to make the network act like a uniform desktop, in order to ensure usability of the desktop service nearing that of what is provided at a typical desktop computer. Such services comprise single sign on support, network printer management, universal serial bus (USB) device redirection, time zone management, a group of policy controls for managing the overall experience, and the like.

Monitoring agent 1245 is configured to collect information from physical and virtual VSS nodes, present a subscription interface for other local components, and forward filtered information to the data center 1210 and global levels 1205.

According to one embodiment of the present invention, monitoring agent 1245 is a VSS-level collector and publisher of monitoring information. Monitoring information in the VSS/N may be used to:

1. Establish the operating state of a VSS device (and its components) to ensure that failures are detected and acted upon in a timely manner;
2. Evaluate the performance of a VSS device in the context of the service level agreements that are in place for the services running on the device to ensure that contracts are being met;
3. Analyze the performance of the VSS for a given service to enable service owners to make adjustments to their resource requirements; or
4. Provide an audit trail for events to enable post-mortem analysis and reporting for regulatory and compliance purposes.

According to one embodiment of the present invention, monitoring agent 1245 is adapted to capture reliable monitoring data for all relevant levels of the VSS/N, including physical machines, virtual machine, application services (e.g. virtual desktop service) and core stack services. Monitoring agent 1245 is further configured to propagate the appropriate level of monitoring information to the various consumers that require it. Monitoring agent 1245 is further configured to integrate feedback loops into components that can take automated action on occurrence of defined conditions According to one embodiment of the present invention, sufficient monitoring information is captured at each level in a VSS device to meet the objectives above. Source level data is propagated from the lowest level (physical machine) to the highest level (global catalog) of the VSS/N. Appropriate filtering and aggregation will be applied to the data to (a) maintain performance and (b) facilitate the decisions that need to be made by consumers of the information at each level of the VSS/N. Consumers comprise human administrators, reporting services that feed graphical user interfaces, and controlling services such as service agents that can initiate actions against the VSS device. Each consumer type will receive information in the appropriate context to facilitate the type of decision made by that consumer.

One feedback loop exists between the VSS device and the local scheduler to verify whether the execution of a scheduled job completed successfully or failed. Another feedback loop exists between the physical/virtual machines and the entities controlling the services running on a VSS device.

According to one embodiment of the present invention, a VSS/N implements a 'pluggable' monitoring framework to allow easy integration of providers/agents of monitoring events and data. For example, the Message Board described in commonly assigned U.S. patent application Ser. No. 11/410, 536 to David Cohen, filed Apr. 24, 2006 and entitled "System and Method for Low Latency Market Data" could be implemented as a consumer of detailed monitoring information and as a provider of monitoring information to other consumers. The framework is thus adaptable to the monitoring requirements of new devices and services—as the VSS/N system matures, the number and type of monitoring consumers and producers is expected to grow to support these devices and services.

Process View

These basic processes are presented here to provide context for the following functional and component descriptions. More detailed processes and the handling of exceptions are discussed in the use cases presented below.

Figure 13:
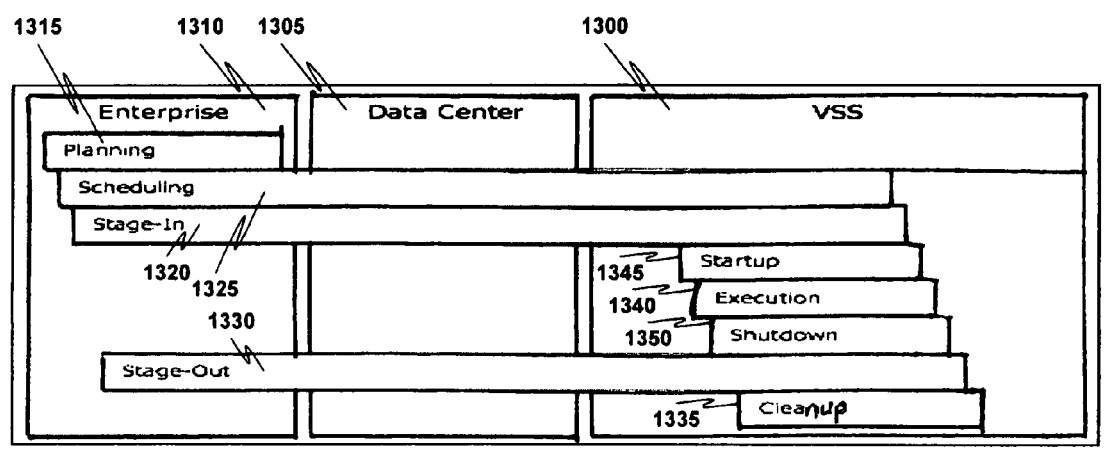
FIG. 13 is a block diagram that illustrates a virtual service switch capacity creation process, in accordance with one embodiment of the present invention.

According to one embodiment of the present invention, a VSS/N implements two major processes: capacity creation and capacity consumption. The capacity creation process moves through a series of distinct phases to create and destroy a service as shown in FIG. 13. The processes illustrated in FIG. 13 may be implemented in hardware, software, firmware, or a combination thereof.

According to one embodiment of the present invention, the virtual desktop capacity creation process comprises planning 1315, scheduling 1325, stage-in 1320, startup 1345, execution 1340, shutdown 1350, stage-out 1330, and cleanup 1335. These processes are described in more detail below.

In planning 1315, through the portal, a capacity plan is created within the global catalog, comprising capacity requests roughly of the form 'X desktops of Y service class in location Z from time $t_0$ to time $t_1$.' (Such a request is composed from multiple elements within the global catalog.) The global scheduler accepts the frozen window of the capacity plan, and turn this into a concrete schedule based on information in the global catalog such as the available resources, current reservations, and system configurations.

In scheduling 1325, prior to startup time, the global scheduler migrates schedule information down through the data center scheduler to the VSS local scheduler.

In stage-in 1320, the local scheduler issues commands to the enactment engine that stages data (e.g. OS image files, service input files) from the Enterprise repository within the global catalog.

In startup 1345, the local scheduler verifies that the service agent for the selected service is available (service agent instantiation is a separate process). It then issues enactment commands that boot servers with a VM hypervisor, and grants control over the servers to the virtual machine service agent. The virtual machine service agent, in turn, boots virtual machines with a desktop operating system (e.g. WinXP) and grants control over this VM capacity and VMs to the desktop service agent.

In execution 1340, the service is configured to provide its function according to its schedule.

In shutdown 1350, as shutdown approaches, the local scheduler negotiates with the virtual machine service agent that in turn negotiates with the desktop service agent for the return of resources. At shutdown time, the local scheduler assumes control of the physical resources.

In stage-out 1330, the local scheduler issues commands to the enactment engine that stages data (e.g. output data, log files) from the VSS to the enterprise repository within the global catalog.

In cleanup 1335, the local scheduler optionally performs one or more cleanup tasks to prepare the physical resources for succeeding resource requests.

Figure 14:
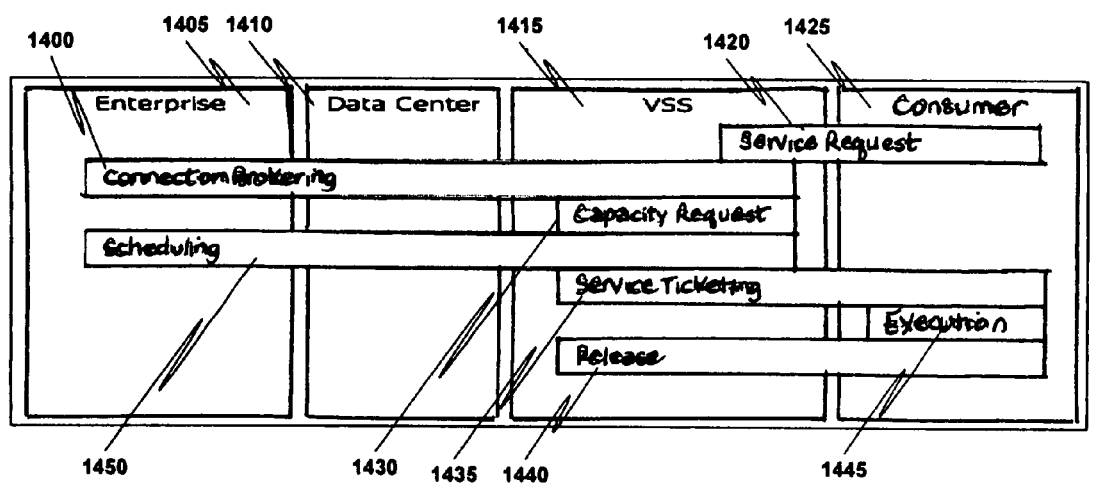
FIG. 14 is a block diagram that illustrates a virtual service switch capacity consumption process, in accordance with one embodiment of the present invention.

FIG. 14 is a block diagram that illustrates a virtual service switch capacity consumption process, in accordance with one embodiment of the present invention. The processes illustrated in FIG. 14 may be implemented in hardware, software, firmware, or a combination thereof. As shown in FIG. 14, service consumers drive the capacity consumption process, which moves from service request through service capacity release as shown below. This is the customer-facing process of a VSS/N. This sub-process exists within the overall construct of the creation process.

According to one embodiment of the present invention, the capacity consumption process comprises a service request 1420, connection brokering 1400, a capacity request 1430, scheduling 1450, service ticketing 1435, execution 1445, and release 1440. At 1420, end users or service consumers access a service through a global address or URI. This address specifies parameters for connecting with a valid service instance. At 1400, each request is individually evaluated and directed to the most appropriate instance of the class of service requested. This brokering process may allow a request to be serviced by a partition within a VSS device not local to the point of request. If, at 1430 there are no available instances of a service, the desktop service agent requests more capacity from the service management framework using its resource manager. At 1450, the service management framework is able to drive additional capacity requests into the local scheduler which can then either evaluate the "spot market" condition and fulfill within the local hardware environment, or push the request up the chain of schedulers. Once capacity is identified, at 1435 a secure ticket is generated for use of this service. This ticket is returned to the service consumer for presentation at the point of service. Once the security token is validated, at 1445 the service is consumed, and the capacity is fully removed from the available pool. Upon completion of the service utilization, at 1440 the capacity is released and returned to the available pool.

Service Agents

According to one embodiment of the present invention, one or more Service agent "plug-ins" are created for each service to be deployed on a VSS device. Each plug-in abstracts away the specific details of the service it represents. The interaction between the schedulers and the SMF is part of the Service Preparation process and operates as follows:

1. Startup—The service agent is loaded into the SMF. This action is driven by the scheduler calling on the SMF to load the appropriate service agent(s) required by a job. The service agent is loaded directly from the global catalog. The service agent on each node is then started up and configured with appropriate policies.
2. Execution—The service agent operates autonomously to drive the required actions on any services instances that are created on it's VSS by the schedulers.
3. Shutdown—The SMF shuts down the service agent. This action is driven by the scheduler calling on the SMF to unload the appropriate service agent(s).

According to one embodiment of the present invention, service agents are loaded into the local instance of the Service Management Framework that runs in each VSS device. Each device then loads the plug-in as part of making the service available. This load causes the device to become available to provide the service corresponding to its agent.

According to one embodiment of the present invention, a service agent mediates the interaction between service consumers and service instances running on a VSS device. A service agent using the connection broker seeks to provide a best fit connection to a service's consumer. The agent actively manages the DHT of service parameters to assist with the calculations.

According to one embodiment of the present invention, a service agent calculates a service's entry points, and work with the DNS to publish an efficient set or subset of these entry points. The connection broker uses the SMF table to find a nearest neighbor service instance.

The service agent does not normally drive scheduling actions. The scheduler, along with the appropriate enactment controller(s) completes deployment of the required service instances and notifies the service agent to assume its management role. However, in case of service failures and other edge conditions, a service agent may interact with the scheduling and enactment frameworks to reset, restart or teardown a failed service. An interface to the scheduler and enactment engine is presented through the SMF, assisting in the translation between job and service related requests. This external interface also is configured to provide access to monitoring and notification services as appropriate.

In these edge cases, the service management framework enables a service agent to provide pre-emptive scheduling capabilities.

Service Management Agent

According to one embodiment of the present invention, the virtual desktop service requires the presence of an agent within an actual desktop operating system image. This agent is used to signal the availability and removal of a desktop from service. The agent registers with a DSA local to its particular VSS device. This registration allows the service agent to begin active monitoring and control of the service instance. The agent is configured to provide notifications of service events such as client connect and disconnect.

Use Case: Service Manager Provides Generic Capacity

The following use case describes the actions of the various components to allow a service manager to effectively provide a unit of physical capacity according to a capacity plan. The scenario assumes the existence of an external capacity plan that is being implemented through the infrastructure and the availability of resources to implement the plan. The scenario is as follows:

1. Through a capacity planning interface, the service manager requests capacity in the basic form of 'X physical units from time $t_0$ to time $t_1$ at location A.'
2. The global scheduler performs a search of available capacity according to its algorithms.
3. If the global scheduler fails to find sufficient capacity for the request, the service manager modifies the request until it succeeds, modifies previous requests to release capacity until the new request succeeds, causes new capacity to be added, and/or abandons the request.
4. Upon success, the global scheduler retains reservations that allow the requested capacity to be provided.
5. As the time $t_0$ approaches, the global scheduler takes various enactment actions to prepare for delivery of the capacity, including migrating schedule information down through data center schedulers to local schedulers. The local schedulers utilize various enactment services as necessary to implement the schedule.
6. The Local scheduler communicates the job definition to the service management framework instance on the head node of any rack that is involved in providing requested capacity.
7. The Local scheduler uses an enactment service to initiate physical boot of all of the nodes required to implement the capacity reservation.
8. The enactment service informs the Local scheduler of the success or failure of the boot processes.
9. The local scheduler reports the results of the instantiation process to higher-level schedulers as appropriate.

Virtual Desktop Use Case Scenarios

Use Case: Service Manager Provides Desktop Capacity

The following use case describes the actions of the various components to allow a service manager to effectively provide desktops according to a capacity plan. The scenario assumes the existence of an external capacity plan that is being implemented through the infrastructure and the availability of resources to implement the plan. The scenario is as follows:

1. Through a capacity planning interface, the service manager requests capacity in the basic form of 'X desktops of Y service class from time $t_0$ to time $t_1$ at location A.'
2. The global scheduler performs a search of available capacity according to its algorithms.
3. If the global scheduler fails to find sufficient capacity for the request, the service manager modifies the request until it succeeds, modifies previous requests to release capacity until the new request succeeds, causes new capacity to be added, and/or abandons the request.
4. Upon success, the global scheduler retains reservations that allow the requested capacity to be provided.
5. As the time $t_0$ approaches, the global scheduler takes various enactment actions to prepare for delivery of the capacity, including migrating schedule information down through data center schedulers to local schedulers. The local schedulers utilize various enactment services as necessary to implement the schedule.
6. The local scheduler instantiates the desktop service agent (DSA) and the virtual machine service agent (VMSA) on the head node of any rack that is involved in providing requested capacity.
7. The local scheduler uses an enactment service to initiate physical boot of all of the nodes required to implement the capacity reservation with appropriate configurations, including a running Hypervisor.
8. The enactment service informs the local scheduler of the success or failure of the boot processes.
9. The local scheduler informs each VMSA of the physical machines under its control that have been successfully booted.
10. The VMSAs alert their associated DSAs of the available VM capacity.
11. The DSAs drive the configuration and enactment of virtual machine capacity to meet their local capacity requirements.
12. The local scheduler reports the results of the instantiation process to higher-level schedulers as appropriate.
13. Once a desktop has booted, its local service management agent reports the capacity as available to its local DSA.
14. The DSAs enable the capacity to be consumed by the appropriate service.
15. If a local scheduler fails to instantiate the necessary agents, it immediately raises an alert to the service manager so that appropriate actions can be taken. Since there may be numerous peer instantiations of each agent, some capacity may still be provided even if agents fail.

If a VMSA does not receive its planned physical capacity because of boot failures, it makes its own on-demand capacity requests from the local scheduler. If these requests succeed, the VMSA can proceed as normal. If these requests fail, the VMSA raises an exception that must be resolved by the service manager.

At this point, the service is now available. Users can request and use the desktop service as described in the further use case 'User Requests Desktop.' The loss of desktop capacity at time t1 is described in the use case 'Scheduled Desktop Capacity Loss.'

Use Case: User Requests Desktop

The following use case describes the actions required for the architecture to respond to a user request for a desktop and also describe the handling of exception conditions by the architecture and the service manager. The scenario assumes that a desktop service has been successfully instantiated as described in use case 'Service Manager Provides Desktop Capacity' The basic sequence occurs as follows:

1. User logs into a thin client workstation.
2. User's credentials are verified with active directory.
3. Thin client requests a desktop from the local connection broker.
4. The connection broker searches across running desktop service agents (DSAs) for available VM capacity that matches the user's requested class of service from those that are available to the user.
5. If capacity is unavailable, see extension scenario 'At Capacity' below.
6. If capacity is available, the DSA selects a VM from the inventory available from the virtual machine service agent (VMSA), prepare the VM to host the user session, and direct the thin client to the prepared VM.
7. The desktop user works.
8. When the user is done working and performs a logout at the workstation, the DSA notes the event, and returns the user's VM to its pool of available VMs.
9. User's sessions time out if left unattended for more than X minutes (according to Group Policy). In this case, the DSA forces the above logout and return the VM to the available pool.

The following use cases 'Scheduled Desktop Capacity Loss' and 'Unscheduled Desktop Capacity Loss' discuss the impact on the user of various system events. If a thin client is connected to a desktop, its network connection may drop.

1. At this point, the DSA is notified that the session has disconnected.
2. The thin client attempts to reestablish connection directly with the desktop for some interval.
3. If it is successful, the DSA is notified. Otherwise, the DSA waits for a timeout.
4. If the timeout occurs, the user is logged out of the desktop and the session terminated.
5. If the user tries to reconnect, by logging into a thin client, the session is reconnected by the DSA.
6. At capacity scenario: If no DSAs have available capacity at the time of a user desktop request, the service manager must remedy the situation.
7. The connection broker and DSAs determine that there is no available capacity to service a request.
8. The connection broker informs the user that there are no desktops available and they should contact their service manager.
9. The DSA signals an exception to the service manager.
10. The service manager may request additional capacity as described in use case 'Service Provides Desktop Service.'
11. After the service manager adds service, the user may successfully request a desktop as described above.

Use Case: Scheduled Desktop Capacity Loss

The following use case describes the actions in response to a scheduled loss in available capacity under specific conditions. The use case also describes the desktop user's experience and service manager User experience and response options. The scenario assumes that the service manager has scheduled a reduction in capacity of the desktop service. The scenarios are launched when desktop users are still working as the moment of the capacity drop approaches. Different system responses apply depending on the number of remaining users and the scheduled and unscheduled capacity available. In the simple case, the VMSA has sufficient available capacity after the loss to handle active services. The scenario is as follows:

1. The local scheduler requests the return of physical machine capacity from the VMSA X minutes (determined by policy) before the capacity is scheduled for other uses.
2. The VMSA examines its VM inventory and determine whether the physical machine capacity can be released without impacting any running services.
3. If the capacity can be safely released, the use case continues. Otherwise, see the exception scenarios below.
4. The VMSA informs the DSA of the loss of VM capacity.
5. The VMSA informs the local scheduler that the resources can be released as scheduled.

In this primary scenario, the user and service manager are not impacted in any way.

Extended Scenarios: These scenarios cover the various levels of exceptions. If there are insufficient unused machines available, the VMSA makes a further determination. If there are enough remaining physical machines after the capacity loss to host all running services, then we are in the migration scenario. If there are not enough physical machines, then we are in the On-Demand Scenario.

Migration Scenario: In this scenario, the VMSA has enough capacity to host its running services, but it must pack the VMs of those services into the available physical capacity.

1. The VMSA informs the DSA of the impending loss of capacity.
2. Using monitoring information about node state, the VMSA determines which nodes must be migrated, determine which nodes are available as migration destinations, and decide (based on a combination of node availability and policy) exactly where to migrate each node.
3. The DSA informs desktop users of an imminent suspension of their desktop and provide appropriate warnings.
4. After the warning expires, the DSA suspends the desktops.
5. Using an enactment interface provided by the VMSA, the DSA migrates the VMs to their new locations.
6. The DSA resumes the desktop users' sessions on the new VMs.
7. The VMSA returns the requested physical capacity to the local scheduler.
8. On-Demand scenario: In this scenario, the VMSA has determined that capacity cannot be released without adversely impacting running services. This is often due to failures to release machines.
9. The VMSA makes an on-demand request for physical machine capacity from the local scheduler.
10. If this request fails, we are in the escalation scenario below. If this request succeeds, we can continue.

11. The local scheduler prepares additional physical machines and inform the VMSA of their availability.
12. The VMSA initiates migrations (as above) as necessary to move all VMs to the new physical machine capacity.
13. Escalation Scenario: This scenario occurs when the on-demand request above returns a failure.
14. The VMSA has received a response from the local scheduler that there are no available physical machines to augment the VMSA's currently scheduled capacity. This results in an exception which the VMSA and DSA cannot fully resolve.
15. The VMSA and DSA initiate a migration of VMs to minimize its capacity overrun, as described in the migration scenario.
16. The VMSA raise an exception to the local scheduler, noting the capacity that it is retaining to avoid service interruption.
17. The local scheduler raises an exception to the DataCenter and global schedulers, stating that a physical machine cannot be made available as scheduled.
18. The global scheduler places itself in an exception state and alert the service manager.
19. The service manager accesses a console to review the exception and the schedule.
20. The service manager may remedy on the schedule exception by removing, re-scheduling or otherwise modifying capacity requests.

Use Case: Unscheduled Desktop Capacity Loss

The following use case describes the actions of the desktop service agent (DSA) and the virtual machine service agent (VMSA) in response to an unscheduled loss in available capacity (i.e. a physical node fails) under various conditions. The use case also describes the desktop user experience and service manager user experience and response options. The scenario assumes there is a running desktop service with a significant number of users. The scenario is as follows:

1. The DSA notes the failure of requests to a VM and removes the VM from its capacity pool.
2. The DSA continues to service user requests by filling up its remaining capacity.
3. New or repeated requests above capacity are failed until capacity can be made up.
4. The DSA informs the VMSA of the failure and request additional VMs.
5. If the VMSA has available VMs it hands them over to the DSA and the scenario concludes.
6. If not, the VMSA makes an on-demand request for additional physical machine(s) from the physical machine scheduler. If this request fails, we are in the escalation scenario below. If this request succeeds, we continue.
7. The physical machine scheduler prepares the requested physical machine(s) and hands them over to the VMSA.
8. The VMSA informs the DSA of the new capacity.
9. The DSA adds the new resources to its pool and continue to service users as usual.
10. Extension Scenarios:
11. Escalation Scenario: This scenario occurs when the on-demand request above returns a failure.
12. The VMSA has received a response from the physical machine scheduler that there are no available physical machines to repair the DSA's capacity loss. This results in an exception which the VMSA cannot resolve.
13. The VMSA raise an exception to the local scheduler, stating that an unscheduled capacity loss cannot be automatically repaired.
14. The local scheduler places itself in an exception state and alert the service manager.
15. The service manager accesses a console to review the exception and the schedule.
16. The service manager may attempt to remedy the capacity loss by removing, re-scheduling or otherwise modifying capacity requests.

HPC Use Case Scenarios
Use Case: Service Manager Provides HPC Capacity

The following use case describes the actions of the various components that allow a service manager to effectively provide HPC service (comprising one head node and one or more worker nodes) according to a capacity plan. The scenario assumes the existence of an external capacity plan. The scenario is as follows:

1. Through a capacity planning interface, the service manager requests capacity in the basic form of 'X clusters of Y nodes of class Z from time $t_0$ to time $t_1$.'
2. The global scheduler performs a search of available capacity according to its algorithms.
3. If the global scheduler fails, the service manager modifies the request until it succeeds, modifies previous requests to release capacity until the new request succeeds, causes new capacity to be added, and/or abandons the request.
4. Upon success, the global scheduler retains reservations that allow the requested capacity to be provided.
5. As the time $t_0$ approaches, the global scheduler takes various enactment actions to prepare for delivery of the capacity, including migrating the schedule information down to the data center, and local schedulers. The local schedulers utilize various enactment services as necessary to accomplish these tasks.
6. The local schedulers instantiate the HPC service agent (HPCSA) on the head node of any rack that is involved in providing requested capacity.
7. The local schedulers use enactment services to physically boot a single node for each cluster, configured as the cluster head node.
8. The local scheduler uses enactment services to physically boot all worker nodes required to implement the capacity reservation with appropriate cluster configurations.
9. The local scheduler informs each HPCSA of the physical machines under its control that have been successfully booted.
10. The HPCSA informs the connection broker that it has a cluster available for HPC jobs.

If a local scheduler fails to instantiate the necessary agents, it will immediately raise an alert to the service manager so that appropriate actions can be taken. Since there may be numerous peer instantiations of each agent, some capacity may still be provided even if agents fail.

If a HPCSA does not receive its planned physical capacity because of boot failures, it makes its own on-demand capacity requests from the local scheduler. If these requests succeed, the HPCSA can proceed as normal. If these requests fail, the HPCSA raises an exception that must be resolved by the service manager.

At this point, the HPC service is available. HPC users are directed by the Connection Broker to cluster head nodes. Users can submit jobs to the cluster head node. The loss of HPC capacity at time t1 is described in the use case 'Scheduled HPC Capacity Loss.'

Use Case: User Submits HPC Job

The following use case describes the actions required to respond to a user request for an HPC job and also describe the handling of exception conditions by the infrastructure and the service manager. The scenario assumes that the HPC service agent (HPCSA) and scheduler have installed and configured the appropriate HPC application based on the service manager's request for HPC capacity. This pre-stage process is assumed to be successful as part of the use case 'Service Manager Provides HPC Capacity'. The scenario is as follows:

1. HPC User at workstation used connection broker to discover available HPC application.
2. HPC User at workstation provides login credential to the HPC application.
3. The HPC User submits a job request to the HPC application.
4. The HPC application initiates the required computational programs to carry out the user request within the virtual HPC environment.
5. The HPC application job completes and returns the required results.
6. The User signs off the HPC application.
7. The HPC application remains available for additional requests until the schedule capacity expires.

The following use cases 'Scheduled HPC Capacity Loss' and 'Unscheduled HPC Capacity Loss' discuss the impact on the user of various system events.

Use Case: Scheduled HPC Capacity Loss

The following use case describes the actions of the HPC service agent in response to a scheduled loss in available capacity under specific conditions. The use case also describes the HPC user experience and service manager user experience and response options. The scenario assumes that the service manager has scheduled for reduced capacity of the HPC service during working hours. HPC service is assumed to be a lower-priority service. HPC services are not allowed the option to extend their scheduled capacity. Long-running HPC jobs should only be scheduled on 24-hour HPC services. The scenario is as follows.

1. The HPCSA informs the HPC application of the upcoming loss of capacity X minutes (determined by policy) before that capacity is scheduled to be lost. The unit of capacity loss is the physical machine.
2. It is assumed that completed HPC jobs leave no state on the HPC cluster. Result sets must be moved as a part of the job submission process to a persistent data store.
3. The HPC application ends submissions to machines that are unavailable and do any check pointing or other preparation that it supports.
4. The HPCSA notifies the HPC application that the physical machines are no longer available.
5. The local scheduler takes over the physical machines to meet other scheduled commitments.

Jobs that are in progress when the physical machine is returned to the local scheduler are lost. It is up to the HPC user and HPC application to manage the re-submission of the job at a later date.

Use Case: Unscheduled HPC Capacity Loss

The following use case describes the actions of the HPC service agent (HPCSA) in response to an unscheduled loss in available capacity (i.e. a physical node failure) under various conditions. The use case also describes the HPC User's experience and service manager's user experience and response options. The scenario assumes there is a running HPC service with a significant number of running jobs. The scenario is as follows:

1. (Note: Multiple notification routes are possible. Assume that the HPCSA and local scheduler both note the problem.)
2. The HPCSA notes the failure of requests to a physical server and removes the physical server from its capacity pool.
3. The monitoring agent of the local scheduler notes a node failure and alerts the HPCSA.
4. The HPCSA removes the machine from its available capacity.
5. The local scheduler informs the service manager that an unscheduled outage has occurred.
6. The HPCSA continues to service job requests with its remaining capacity.
7. The HPCSA requests additional physical machine(s) from the local scheduler. If this request fails, we are in the Escalation Scenario below. If this request succeeds, we can continue.
8. The local scheduler boots and configures the additional machines and then hands them over to the HPCSA.
9. The HPCSA informs the HPC application of the new resources.
10. The HPC adds the nodes to its pool and continue to service jobs as usual.
11. Extension Scenarios:
12. Escalation Scenario: This scenario occurs when the on-demand request above returns a failure.
13. The HPCSA has received a response from the local scheduler that there are no available physical machines to repair the HPCSA's capacity loss. This results in an exception which the HPCSA cannot resolve.
14. The HPCSA raises an exception to the local scheduler, stating that an unscheduled capacity loss cannot be automatically repaired.
15. The local schedule places itself in an exception state and alert the service manager.
16. The service manager accesses a console to review the exception and the schedule.

The service manager may attempt to remedy the capacity loss by removing, re-scheduling, or otherwise modifying capacity requests.

Demand Management via Mediation

According to one embodiment of the present invention, a virtual service switch is configured to meter demand by acting as a DNS redirection service and IP load balancer. An instance of the Service Management Framework is deployed on the head nodes of each VSS device. This is a peer-to-peer, network service that mediates incoming connection requests on to target end-points capable of satisfying the request.

According to this embodiment of the present invention, the "/etc/services" and "/etc/protocols" files are migrated into a centralized catalog accessible via LDAP or the like. This capability is part of the Virtual Service Switch's global catalog. It supports: (i) maintaining entries in the "Services" and "Protocols" braches of the catalog and (ii) integrates with "standard" mechanisms for resolving these at runtime.

The global catalog also provides support for defining and maintaining application names. These are entries in the Virtual Service Switch's DNS domain, whose authority is delegated from an organization's DNS root. According to one embodiment of the present invention, an application name must be a valid DNS SRV "name" that, when combined with a "protocol (proto)" and "service type (service)," can be resolved in accordance to rfc2782.

By default, the Application's SRV entry will have a "." in the target field indicating that the service is not available in the domain. This will be replaced as the application enters into leases. When a lease is subsequently enacted [by the domain's team of schedulers] the application's SRV entries are extended for each target that registers [during the enactment process]. Similarly, these entries are removed as registered targets go off-line.

As a machine comes online it calls the instance of the service management framework running on the local head nodes; registering the port number/IP address pair for the application that it has been assigned to. This registration operation may include the cookie the machine had previously been issued.

Upon receiving the registration, the service management framework does a [secure] dynamic DNS Update to associate the new target with the application's SRV entry. It also updates its internal state and begins monitoring the entries load: (i) connection arrival rate, (ii) connection packets per second (in/out), and (iii) connection bytes per second (in/out). When a connection is terminated these entries are summarized and logged along with the associated cookie.

Connection Mediation

Figure 15:
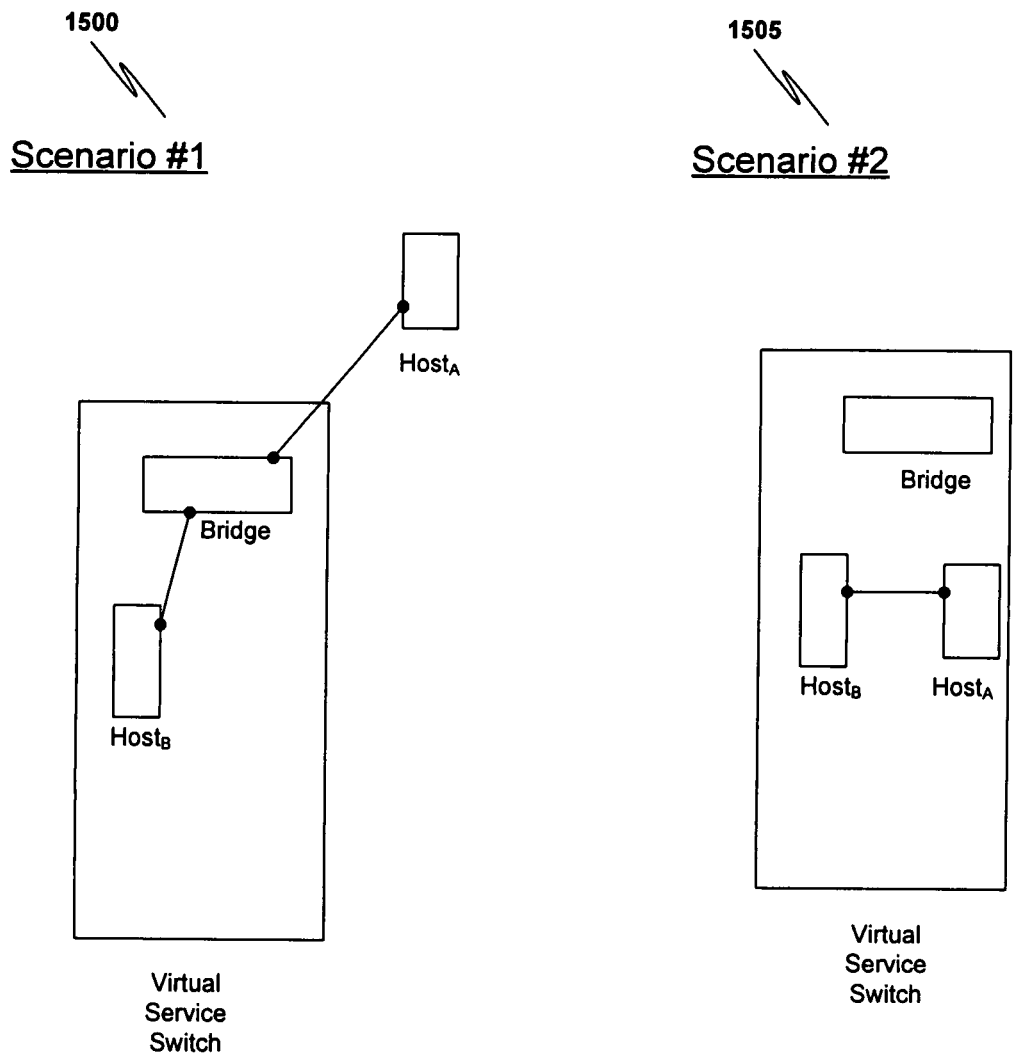
FIG. 15 is a block diagram that illustrates a virtual service switch configured to perform connection mediation, in accordance with one embodiment of the present invention.

FIG. 15 is a block diagram that illustrates a VSS configured to support connection mediation, in accordance with one embodiment of the present invention. Two host-to-host connection scenarios are shown: (i) connectivity with an external entity (1200) and (ii) connectivity with an internal entity (1205).

According to one embodiment of the present invention, a VSS automates server selection of arriving connection requests on a per-application basis. As connection requests are received by an instance of the service management framework (running on the head nodes of a particular VSS device), it is able to efficiently ascertain the load on machines currently registered for the application. It does this with preference to local end points/targets (i.e. those residing in the local VSS device). If one or more of these exists and meets the load balancing optimizer's criteria than one is selected in satisfaction of the request. Otherwise, the service management framework then initiates a broader search using its internal, peer-to-peer, DHT and its associated routing algorithm. If one or more of these exists and meets the load balancing optimizer's criteria than one is selected in satisfaction of the request. Otherwise, an error is indicated and the connection request is failed. This event is logged and possibly monitored.

Metering

According to one embodiment of the present invention, a VSS reduces the application owner's uncertainty by providing stakeholders with better information, which can be used to expand limits imposed on the data center's capacity. Capturing data in a way that is actionable means synthesizing information in a timeframe where a decision to act has value. The Virtual Service Switch meters load for this purpose.

Metering by a VSS focuses on relating a machine's temperature, packets per second (in/out), and bytes per second (in/out) to power (i.e. temperature fluctuations over time) and connectivity (i.e. packets and bytes).

According to one embodiment of the present invention, a VSS implements a private network that is bridged to the external Ethernet. This is illustrated at reference numeral 1500 of FIG. 15. Bridging is employed in order to connect the internal network segment with the external Ethernet in a protocol-independent way. During communication between hosts on the internal network and those reachable via the external Ethernet, packets are forwarded based on Ethernet address, rather than IP address. Since forwarding is done at Layer 2, all protocols can go transparently through a bridge. When configured with something other than Ethernet, the device's bridging implementation must also translate packets to/from Ethernet.

By employing network bridging, in the case of Infiniband, the VSS provides a means of translating between Ethernet and Infiniband packet formats, thus allowing packets to be forwarded between hosts connected on the two different types of network segments. Packets are forwarded based on their network address (i.e. Ethernet, Infiniband, etc) rather than IP address (like a router). Since forwarding is done at Layer 2, all protocols can go transparently through a bridge.

Additionally, by employing network bridging, the VSS serves as a control point. A flow is defined as all the packets that are received on one interface, enter the bridge and are sent to another interface. Use of bridging allows flows to be turned on and off as well as be metered. Only registered targets may be connected to by external entities. A flow is turned on and off during the registration process. Once turned on it is [aggressively] the flow is metered using SFlow/rfc3176 (or an equivalent). The SFlow stream is fed into the Index service running on the head nodes of the [local] VSS.

According to another embodiment of the present invention, two hosts in communication reside within the same VSS. This is illustrated at reference numeral 1505 of FIG. 15. In this case, the list of supported transports is extended beyond TCP, UDP, and SCTP to include RDMA. Regardless of which transport connectivity is still established via DNS and the Service Management Framework. And this connectivity is metered in a manner equivalent to the SFlow approach applied to flows passing through the bridge.

Correlating Connectivity to Capacity via HTTP-Style Cookies

According to one embodiment of the present invention, a VSS is configured to perform metering by associating a cookie with (a) machine load as a function of application connectivity over time and (b) the power consumed by the machine during that same time interval. As part of the provisioning process, a machine is assigned/issued a cookie, analogous to http. This cookie that represents the life of the machine, from the time it was started to the time it was destroyed. Schedulers are configured to augment the cookie's informational content as metered data is aggregated and passed up the hierarchy.

Dynamic Capacity Management via Credit Derivatives

Hedging Through Avoidance

Alternative Risk Transfer (ART) refers to techniques used to protect against risk when traditional insurance is unavailable. An entity faced with such risk pays to increase available information. The derivative contract provides an incentive for participants to improve data collection and provide a means of "information transfer." Enterprises pay a premium to hedge against such risks, writing contracts that track things like heating (or cooling) degree-days, frost days, monthly/seasonal snowfall, etc.

According to one embodiment of the present invention, a statistical approach is used to characterize single device behaviors from those of a large number of statistically similar devices. In so doing, the system advances a stake holder's ability to quickly identify failures so that they can be repaired either automatically or via out-of-band means (e.g. rebooting). Additionally, the system provides a stakeholder the means of recognizing deviating operational conditions have (or soon will) invalidate their plans (e.g. demand forecasts, capacity commitments, etc). And given recognition of such conditions, the system provides clear, well-defined methods of risk mitigation. This embodiment of the present invention provides such methods by viewing an IP network, specifically application connectivity, as the driving force of uncertainty within the data center. From this perspective, an application's uncertainty arises from the arrival rate of connections and the incremental load that the marginal connection places on the application's capacity.

The internal workings of a particular application are irrelevant to the problem. The measurable inputs are (i) Arrival Rate of Connections, (ii) Packets-In/Packets-Out (as a function of time per connection and machine), (iii) Bytes-In/Bytes-Out (as a function of time per connection and machine), and (iv) Energy (as a function of Power-In/Heat-Out per machine over time).

Reacting to Variance in Plan

In addition to the capital asset, a lease contract has as its underlying asset a series of rents. These can be securitized via quantitative financial methods (i.e. NPV/discounted cash flows). This process is an example of a credit derivative whose purpose is to transfer the risk of the total return on a credit asset falling below an agreed level, without transfer of the underlying asset.

According to one embodiment of the present invention, subleasing is used to enable this method of transferring the risk. Assets are subleased from a sufficient number of leaseholders so that in the aggregate the underlying value motivates the bearer's risk to enable a multiplexing gain. Such gain is derived from the stochastic nature of application connectivity over the IP network. In fact, this is the same class of multiplexing employed by the underlying IP network. But instead of multiplexing bandwidth over a data/packet network the gain is realized in the present embodiment by multiplexing application access to data center capacity.

According to this embodiment of the present invention, an Enterprise's data centers are modeled as a network. A hierarchy of schedulers is deployed (i) locally within a virtual service switch, (ii) across a set of virtual service switches in a data center, (iii) regionally, across a set of data centers, and (iv) globally, across regions.

In addition to leasing the capacity under their control, these schedulers meter application load across the data center topology. At the data center, regional, and global levels of the hierarchy, a continuous simulation of data center operations are maintained. This model reflects load patterns amongst constituent applications. This information is used to price options for the purpose of providing an incentive to applications with underutilized resource to sublease their capacity.

In parallel, the scheduler markets these options to constituents in the data center network. These applications are given an opportunity to hedge against the uncertainty of their having enough capacity to meet their needs (at some point in the future).

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method comprising:
    creating a futures contract with a first requestor, the futures contract providing the first requestor with a unit of computing capacity to a service for a specific future time period and for a first price, the first price comprising an amount the first requestor is willing to pay to buy the unit of computing capacity;
    receiving from the first requestor software code and associated data, the reception of the software code and associated data from the first requestor being an indication that the futures contract has been fixed;
    creating, by one or more computing systems, one or more plans based at least in part on the contracting, each plan comprising:
        an indication of resources required to provide the unit of computing capacity; and
        one or more policies for exception handling;
    scheduling, by the one or more computing systems, execution of the one or more plans using the computing capacity, the scheduling comprising metering demand for an individual application in terms of connection requests over time, load in terms of temperature, load flow, and volume, and capacity in terms of plan;
    providing the first requestor with an option to buy additional units of computing capacity at a specified future date;
    receiving from a second requestor after the futures contract has been fixed a bid for at least part of the unit of computing capacity previously contracted to the first requestor, the bid indicating a second price, the second price comprising an amount the second requestor is willing to pay to buy at least part of the unit of computing capacity previously contracted to the first requestor;
    determining, by the one or more computing systems, that the second price indicated in the bid from the second requestor is higher than the first price; and
    in response to the determination, allocating by the one or more computing systems to the second requestor the at least part of the computing capacity previously contracted to the first requestor.

2. The method of claim 1 wherein the scheduling is based at least in part on one or more dynamic capacity requests from one or more service agents.

3. The method of claim 1 wherein a schedule created by the scheduling defines how computing resources are to be allocated to particular tasks over time.

4. The method of claim 1 wherein a request from the first requestor comprises a description of a service.

5. The method of claim 1 wherein a request from the first requestor comprises a description of a quantity of requested computing resources.

6. The method of claim 1 wherein a request from the first requestor comprises a description of a time at which demand for computing resources is expected to materialize.

7. The method of claim 1 wherein a request from the first requestor comprises a description of a duration of expected use of computing resources.

8. The method of claim 1 wherein a request from the first requestor comprises a description of one or more geographic constraints.

9. The method of claim 1, further comprising metering demand for computing capacity by mediating incoming connection requests on target end-points capable of satisfying requests.

10. The method of claim 1, further comprising:
    assigning each of one or more computing resources a cookie, the cookie representing the life of a computing resource; and
    augmenting the cookie associated with a particular computing resource to indicate:
        computing resource load as a function of application connectivity over a time interval; and
        power consumed by the computing resource during the time interval.

11. A method comprising:
    receiving from a first requestor, a request for computing resources to meet a demand for a service for a specific future time period and for a first price, the first price comprising an amount the first requestor is willing to pay to lease the computing resources, the service configured to provide a functionality;

creating a futures contract with the first requestor, the futures contract granting to the first requestor a lease of a unit of computing capacity based at least in part on the request;

receiving from the first requestor software code and associated data, the reception of the software code and associated data from the first requestor being an indication that the futures contract has been fixed;

creating, by one or more computing systems, a capacity plan comprising:
one or more parameters of the request;
an indication of resources required to provide the unit of computing capacity; and
one or more policies for exception handling;

creating, by the one or more computing systems, a schedule based on the capacity plan and information regarding one or more of available computing resources, reservations for computing resources, and system configurations, the schedule comprising metered demand for an individual application in terms of connection requests over time, load in terms of temperature, load flow, and volume, and capacity in terms of plan;

providing, by the one or more computing systems, the first requestor with an option to buy additional computing resources at a specified future date;

receiving from a second requestor after the futures contract has been fixed a bid for at least part of the unit of computing capacity previously granted to the first requestor, the bid indicating a second price, the second price comprising an amount the second requestor is willing to pay to lease at least part of the unit of computing capacity previously granted to the first requestor;

determining, by the one or more computing systems, that the second price indicated in the bid from the second requestor is higher than the first price; and in response to the determination, allocating by the one or more computing systems to the second requestor the at least part of the unit of computing capacity previously granted to the first requestor.

12. The method of claim 11 wherein the schedule is based at least in part on one or more dynamic capacity requests from one or more service agents.

13. The method of claim 11 wherein the schedule defines how the computing resources are to be allocated to particular tasks over time.

14. The method of claim 11 wherein the one or more parameters comprise a description of a service.

15. The method of claim 11 wherein the one or more parameters comprise a description of a quantity of the computing resources.

16. The method of claim 11 wherein the one or more parameters comprise a description of a time at which demand for the computing resources is expected to materialize.

17. The method of claim 11 wherein the one or more parameters comprise a description of a duration of expected use of the computing resources.

18. The method of claim 11 wherein the one or more parameters comprise a description of one or more geographic constraints.

19. The method of claim 11, further comprising metering demand for computing capacity by mediating incoming connection requests on target end-points capable of satisfying the requests.

20. The method of claim 11, further comprising:
assigning each of the computing resources a cookie, the cookie representing the life of a computing resource; and
augmenting the cookie associated with a particular computing resource to indicate:
computing resource load as a function of application connectivity over a time interval; and
power consumed by the computing resource during the time interval.

21. An apparatus comprising:
one or more computing resources configured to load software and data in advance of producing a specific computation; and
a virtual service switch coupled to the one or more computing resources and configured to:
create a futures contract with a first requestor, the futures contract providing the first requestor with a unit of computing capacity to a service for a specific future time period and for a first price, the first price comprising an amount the first requestor is willing to pay to buy the unit of computing capacity;
receive from the first requestor software code and associated data, the reception of the software code and associated data from the first requestor being an indication that the futures contract has been fixed;
create one or more plans based at least in part on the contracting, each plan comprising:
an indication of resources required to provide the unit of computing capacity; and
one or more policies for exception handling;
schedule execution of the one or more plans using the computing capacity, the scheduling comprising metering demand for an individual application in terms of connection requests over time, load in terms of temperature, load flow, and volume, and capacity in terms of plan;
provide the first requestor with an option to buy additional units of computing capacity at a specified future date;
receive from a second requestor after the futures contract has been fixed a bid for at least part of the unit of computing capacity previously contracted to the first requestor, the bid indicating a second price, the second price comprising an amount the second requestor is willing to buy at least part of the unit of computing capacity previously contracted to the first requestor;
determine that the second price indicated in the bid from the second requestor is higher than the first price; and
in response to the determination, allocate to the second requestor the at least part of the computing capacity previously contracted to the first requestor.

22. The apparatus of claim 21 wherein the virtual service switch is further configured to schedule execution of the one or more plans based at least in part on one or more dynamic capacity requests from one or more service agents.

23. The apparatus of claim 21 wherein the virtual service switch is further configured to define how computing resources are to be allocated to particular tasks over time.

24. The apparatus of claim 21 wherein a request from the first requestor comprises a description of a service.

25. The apparatus of claim 21 wherein a request from the first requestor comprises a description of a quantity of requested computing resources.

26. The apparatus of claim 21 wherein a request from the first requestor comprises a description of a time at which demand for computing resources is expected to materialize.

27. The apparatus of claim 21 wherein a request from the first requestor comprises a description of a duration of expected use of computing resources.

28. The apparatus of claim 21 wherein a request from the first requestor comprises a description of one or more geographic constraints.

29. The apparatus of claim 21 wherein the apparatus is further configured to meter demand for computing capacity by mediating incoming connection requests on target endpoints capable of satisfying the requests.

30. The apparatus of claim 21 wherein the apparatus is further configured to:
assign each of one or more computing resources a cookie, the cookie representing the life of a computing resource; and
augment the cookie associated with a particular computing resource to indicate:
computing resource load as a function of application connectivity over a time interval; and
power consumed by the computing resource during the time interval.

31. The apparatus of claim 21, further comprising a monitoring agent configured to collect information about the apparatus, filter the information to create filtered information, and forward the filtered information.

32. The apparatus of claim 21 wherein the one or more computing resources are logically organized as a Beowulf-style cluster of resources.

33. The apparatus of claim 21 wherein the one or more computing resources comprise one or more blade enclosures.

34. The apparatus of claim 33 wherein the one or more blade enclosures comprise one or more diskless blades.

35. An apparatus comprising:
one or more computing resources configured to load software and data in advance of producing a specific computation; and
a virtual service switch coupled to the one or more computing resources and configured to:
receive from a first requestor, a request for computing resources to meet a demand for a service for a specific future time period and for a first price, the first price comprising an amount the first requestor is willing to pay to lease the computing resources, the service configured to provide a functionality;
create a futures contract with the first requestor, the futures contract granting to the first requestor a lease of a unit of computing capacity based at least in part on the request;
receive from the first requestor software code and associated data, the reception of the software code and associated data from the first requestor being an indication that the futures contract has been fixed;
create a capacity plan comprising:
one or more parameters of the request;
an indication of resources required to provide the unit of computing capacity; and
one or more policies for exception handling;
create a schedule based on the capacity plan and information regarding one or more of available computing resources, reservations for computing resources, and system configurations, the schedule comprising metered demand for an individual application in terms of connection requests over time, load in terms of temperature, load flow, and volume, and capacity in terms of plan;
provide the first requestor with an option to buy additional computing resources at a specified future date;
receive from a second requestor after the futures contract has been fixed a bid for at least part of the unit of computing capacity previously granted to the first requestor, the bid indicating a second price, the second price comprising an amount the second requestor is willing to pay to lease at least part of the unit of computing capacity previously granted to the first requestor;
determine that the second price indicated in the bid from the second requestor is higher than the first price; and
in response to the determination, allocate to the second requestor the at least part of the unit of computing capacity previously granted to the first requestor.

36. The apparatus of claim 35 wherein the schedule is based at least in part on one or more dynamic capacity requests from one or more service agents.

37. The apparatus of claim 35 wherein the schedule defines how the computing resources are to be allocated to particular tasks over time.

38. The apparatus of claim 35 wherein the one or more parameters comprise a description of a service.

39. The apparatus of claim 35 wherein the one or more parameters comprise a description of a quantity of the computing resources.

40. The apparatus of claim 35 wherein the one or more parameters comprise a description of a time at which demand for the computing resources is expected to materialize.

41. The apparatus of claim 35 wherein the one or more parameters comprise a description of a duration of expected use of the computing resources.

42. The apparatus of claim 35 wherein the one or more parameters comprise a description of one or more geographic constraints.

43. The apparatus of claim 35 wherein the apparatus is further configured to meter:
demand for an individual application in terms of connection requests over time;
computational load as indicated by one or more of temperature, load pressure/flow, and volume; and
capacity in terms of the capacity plan.

44. The apparatus of claim 35 wherein the apparatus is further configured to meter demand for computing capacity by mediating incoming connection requests on target endpoints capable of satisfying the requests.

45. The apparatus of claim 35 wherein the apparatus is further configured to:
assign each of the computing resources a cookie, the cookie representing the life of a computing resource; and
augment the cookie associated with a particular computing resource to indicate:
computing resource load as a function of application connectivity over a time interval; and
power consumed by the computing resource during the time interval.

46. The apparatus of claim 35, further comprising a monitoring agent configured to collect information about the apparatus, filter the information to create filtered information, and forward the filtered information.

47. The apparatus of claim 35 wherein the one or more computing resources are logically organized as a Beowulf-style cluster of resources.

48. The apparatus of claim 35 wherein the one or more computing resources comprise one or more blade enclosures.

49. The apparatus of claim 48 wherein the one or more blade enclosures comprise one or more diskless blades.

50. An apparatus comprising:
means for creating a futures contract with a first requestor, the futures contract providing the first requestor with a unit of computing capacity to a service for a specific future time period and for a first price, the first price comprising an amount the first requestor is willing to pay to buy the unit of computing capacity;
means for receiving from the first requestor software code and associated data, the reception of the software code and associated data from the first requestor being an indication that the futures contract has been fixed;
means for creating one or more plans based at least in part on the contracting, each plan comprising:
an indication of resources required to provide the unit of computing capacity; and
one or more policies for exception handling;
means for scheduling execution of the one or more plans using the computing capacity, the scheduling comprising metering demand for an individual application in terms of connection requests over time, load in terms of temperature, load flow, and volume, and capacity in terms of plan;
means for providing the first requestor with an option to buy additional units of computing capacity at a specified future date;
means for receiving from a second requestor after the futures contract has been fixed a bid for at least part of the unit of computing capacity previously contracted to the first requestor, the bid indicating a second price, the second price comprising an amount the second requestor is willing to pay to buy at least part of the unit of computing capacity previously contracted to the first requestor;
means for determining that the second price indicated in the bid from the second requestor is higher than the first price; and
means for, in response to the determining, allocating to the second requestor the at least part of the computing capacity previously contracted to the first requestor.

51. The apparatus of claim 50 wherein the scheduling is based at least in part on one or more dynamic capacity requests from one or more service agents.

52. The apparatus of claim 50 wherein a schedule created by the means for scheduling defines how computing resources are to be allocated to particular tasks over time.

53. The apparatus of claim 50 wherein a request from the first requestor comprises a description of a service.

54. The apparatus of claim 50 wherein a request from the first requestor comprises a description of a quantity of requested computing resources.

55. The apparatus of claim 50 wherein a request from the first requestor comprises a description of a time at which demand for computing resources is expected to materialize.

56. The apparatus of claim 50 wherein a request from the first requestor comprises a description of a duration of expected use of computing resources.

57. The apparatus of claim 50 wherein a request from the first requestor comprises a description of one or more geographic constraints.

58. The apparatus of claim 50, further comprising means for metering demand for computing capacity by mediating incoming connection requests on target end-points capable of satisfying requests.

59. The apparatus of claim 50, further comprising:
means for assigning each of one or more computing resources a cookie, the cookie representing the life of a computing resource; and
means for augmenting the cookie associated with a particular computing resource to indicate:
computing resource load as a function of application connectivity over a time interval; and
power consumed by the computing resource during the time interval.

60. An apparatus comprising:
means for receiving from a first requestor, a request for computing resources to meet a demand for a service for a specific future time period and for a first price, the first price comprising an amount the first requestor is willing to pay to lease the computing resources, the service configured to provide a functionality;
means for creating a futures contract with the first requestor, the futures contract granting to the first requestor a lease of a unit of computing capacity based at least in part on the request;
means for receiving from the first requestor software code and associated data, the reception of the software code and associated data from the first requestor being an indication that the futures contract has been fixed;
means for creating a capacity plan comprising:
one or more parameters of the request;
an indication of resources required to provide the unit of computing capacity; and
one or more policies for exception handling;
means for creating a schedule based on the capacity plan and information regarding one or more of available computing resources, reservations for computing resources, and system configurations, the schedule comprising metered demand for an individual application in terms of connection requests over time, load in terms of temperature, load flow, and volume, and capacity in terms of plan;
means for providing the first requestor with an option to buy additional computing resources at a specified future date;
means for receiving from a second requestor after the futures contract has been fixed a bid for at least part of the unit of computing capacity previously granted to the first requestor, the bid indicating a second price, the second price comprising an amount the second requestor is willing to pay to lease at least part of the unit of computing capacity previously granted to the first requestor;
means for determining that the second price indicated in the bid from the second requestor is higher than the first price; and
means for, in response to the determining, allocating to the second requestor the at least part of the unit of computing capacity previously granted to the first requestor.

61. The apparatus of claim 60 wherein the schedule is based at least in part on one or more dynamic capacity requests from one or more service agents.

62. The apparatus of claim 60 wherein the schedule defines how the computing resources are to be allocated to particular tasks over time.

63. The apparatus of claim 60 wherein the one or more parameters comprise a description of a service.

64. The apparatus of claim 60 wherein the one or more parameters comprise a description of a quantity of the computing resources.

65. The apparatus of claim 60 wherein the one or more parameters comprise a description of a time at which demand for the computing resources is expected to materialize.

66. The apparatus of claim 60 wherein the one or more parameters comprise a description of a duration of expected use of the computing resources.

67. The apparatus of claim 60 wherein the one or more parameters comprise a description of one or more geographic constraints.

68. The apparatus of claim 60, further comprising means for metering demand for computing capacity by mediating incoming connection requests on target endpoints capable of satisfying the requests.

69. The apparatus of claim 60, further comprising:
means for assigning each of the computing resources a cookie, the cookie representing the life of a computing resource; and
means for augmenting the cookie associated with a particular computing resource to indicate:
computing resource load as a function of application connectivity over a time interval; and
power consumed by the computing resource during the time interval.

70. A program storage device readable by a machine, embodying a program of instructions executable by the machine to perform a method, the method comprising:
creating a futures contract with a first requestor, the futures contract providing the first requestor with a unit of computing capacity to a service for a specific future time period and for a first price, the first price comprising an amount the first requestor is willing to pay to buy the unit of computing capacity;
receiving from the first requestor software code and associated data, the reception of the software code and associated data from the first requestor being an indication that the futures contract has been fixed;
creating one or more plans based at least in part on the contracting, each plan comprising:
an indication of resources required to provide the unit of computing capacity; and
one or more policies for exception handling;
scheduling execution of the one or more plans using the computing capacity, the scheduling comprising metering demand for an individual application in terms of connection requests over time, load in terms of temperature, load flow, and volume, and capacity in terms of plan;
providing the first requestor with an option to buy additional units of computing capacity at a specified future date;
receiving from a second requestor after the futures contract has been fixed a bid for at least part of the unit of computing capacity previously contracted to the first requestor, the bid indicating a second price, the second price comprising an amount the second requestor is willing to pay to buy at least part of the unit of computing capacity previously contracted to the first requestor;
determining that the second price indicated in the bid from the second requestor is higher than the first price; and
in response to the determination, allocating to the second requestor the at least part of the computing capacity previously contracted to the first requestor.

71. The program storage device of claim 70 wherein the scheduling is based at least in part on one or more dynamic capacity requests from one or more service agents.

72. The program storage device of claim 70 wherein a schedule created by the scheduling defines how computing resources are to be allocated to particular tasks over time.

73. The program storage device of claim 70 wherein a request from the first requestor comprises a description of a service.

74. The program storage device of claim 70 wherein a request from the first requestor comprises a description of a quantity of requested computing resources.

75. The program storage device of claim 70 wherein a request from the first requestor comprises a description of a time at which demand for computing resources is expected to materialize.

76. The program storage device of claim 70 wherein a request from the first requestor comprises a description of a duration of expected use of computing resources.

77. The program storage device of claim 70 wherein a request from the first requestor comprises a description of one or more geographic constraints.

78. The program storage device of claim 70, the method further comprising metering demand for computing capacity by mediating incoming connection requests on target endpoints capable of satisfying requests.

79. The program storage device of claim 70, the method further comprising:
assigning each of one or more computing resources a cookie, the cookie representing the life of a computing resource; and
augmenting the cookie associated with a particular computing resource to indicate:
computing resource load as a function of application connectivity over a time interval; and
power consumed by the computing resource during the time interval.

80. A program storage device readable by a machine, embodying a program of instructions executable by the machine to perform a method, the method comprising:
receiving from a first requestor, a request for computing resources to meet a demand for a service for a specific future time period and for a first price, the first price comprising an amount the first requestor is willing to pay to lease the computing resources, the service configured to provide a functionality;
creating a futures contract with the first requestor, the futures contract granting to the first requestor a lease of a unit of computing capacity based at least in part on the request;
receiving from the first requestor software code and associated data, the reception of the software code and associated data from the first requestor being an indication that the futures contract has been fixed;
creating a capacity plan comprising:
one or more parameters of the request;
an indication of resources required to provide the unit of computing capacity; and
one or more policies for exception handling;
creating a schedule based on the capacity plan and information regarding one or more of available computing resources, reservations for computing resources, and system configurations, the schedule comprising metered demand for an individual application in terms of connection requests over time, load in terms of temperature, load flow, and volume, and capacity in terms of plan;
providing the first requestor with an option to buy additional computing resources at a specified future date;
receiving from a second requestor after the futures contract has been fixed a bid for at least part of the unit of computing capacity previously granted to the first requestor, the bid indicating a second price, the second price comprising an amount the second requestor is willing to pay to lease at least part of the unit of computing capacity previously granted to the first requestor;

determining that the second price indicated in the bid from the second requestor is higher than the first price; and in response to the determination, allocating to the second requestor the at least part of the unit of computing capacity previously granted to the first requestor.

81. The program storage device of claim 80 wherein the schedule is based at least in part on one or more dynamic capacity requests from one or more service agents.

82. The program storage device of claim 80 wherein the schedule defines how the computing resources are to be allocated to particular tasks over time.

83. The program storage device of claim 80 wherein the one or more parameters comprise a description of a service.

84. The program storage device of claim 80 wherein the one or more parameters comprise a description of a quantity of the computing resources.

85. The program storage device of claim 80 wherein the one or more parameters comprise a description of a time at which demand for the computing resources is expected to materialize.

86. The program storage device of claim 80 wherein the one or more parameters comprise a description of a duration of expected use of the computing resources.

87. The program storage device of claim 80 wherein the one or more parameters comprise a description of one or more geographic constraints.

88. The program storage device of claim 80, the method further comprising metering demand for computing capacity by mediating incoming connection requests on target endpoints capable of satisfying the requests.

89. The program storage device of claim 80, the method further comprising:

assigning each of the computing resources a cookie, the cookie representing the life of a computing resource; and augmenting the cookie associated with a particular computing resource to indicate:

computing resource load as a function of application connectivity over a time interval; and power consumed by the computing resource during the time interval.

* * * * *